US008320660B2

(12) United States Patent
Ishiyama

(10) Patent No.: US 8,320,660 B2
(45) Date of Patent: Nov. 27, 2012

(54) IMAGE PROCESSING SYSTEM, 3-DIMENSIONAL SHAPE ESTIMATION SYSTEM, OBJECT POSITION/POSTURE ESTIMATION SYSTEM AND IMAGE GENERATION SYSTEM

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1393 days.

(21) Appl. No.: 11/921,315

(22) PCT Filed: Jun. 2, 2006

(86) PCT No.: PCT/JP2006/311087
§ 371 (c)(1),
(2), (4) Date: Nov. 30, 2007

(87) PCT Pub. No.: WO2006/129791
PCT Pub. Date: Dec. 7, 2006

(65) Prior Publication Data
US 2009/0129665 A1    May 21, 2009

(30) Foreign Application Priority Data
Jun. 3, 2005   (JP) .................................. 2005-164475

(51) Int. Cl.
*G06K 9/00* (2006.01)
*G06T 15/00* (2011.01)
(52) U.S. Cl. ....................................... 382/154; 345/419
(58) Field of Classification Search .................. 382/154; 345/419
See application file for complete search history.

(56) References Cited

U.S. PATENT DOCUMENTS 5,995,639 A    11/1999   Kado et al.
6,002,782 A  * 12/1999   Dionysian ..................... 382/118
(Continued)

FOREIGN PATENT DOCUMENTS
JP           10-326351           12/1998
(Continued)

OTHER PUBLICATIONS

Rui Ishiyama et al., Face Recognition With Automatic Compensation for Both of Pose and Illumination Changes, Technical Report of IEICE, vol. 101, No. 524, PRMU2001-162, Dec. 2001, pp. 59-64.

(Continued)

*Primary Examiner* — Anand Bhatnagar
*Assistant Examiner* — Soo Park
(74) *Attorney, Agent, or Firm* — Foley & Lardner LLP

(57) ABSTRACT

An object of the present invention is to process an image without a need to previously find out the initial value of a parameter representing an illumination condition and without a need for a user to manually input the illumination parameter. An image processing system includes a generalized illumination basis model generation means 300, a position/posture initial value input means 102, a face model generation means 103, an illumination basis model calculation means 301, a perspective transformation means 202, an illumination correction means 203, and a parameter update means 204. The generalized illumination basis model generation means 300 previously calculates a generalized illumination basis model. The face model generation means 103 generates an individual 3-dimensional shape and texture from the generalized 3-dimensional face model. The illumination basis model calculation means 301 generates an individual illumination basis from the generalized illumination basis model using the same parameter. The parameter update means 204 searches for a parameter of a shape, texture, and position/posture to minimize the error when the input image is reproduced.

15 Claims, 11 Drawing Sheets

U.S. PATENT DOCUMENTS

| | | | |
|---|---|---|---|
| 6,181,806 B1 | 1/2001 | Kado et al. | |
| 6,774,896 B2 | 8/2004 | Oka | |
| 6,956,569 B1 * | 10/2005 | Roy et al. | 345/426 |
| 7,227,973 B2 | 6/2007 | Ishiyama | |
| 7,809,159 B2 | 10/2010 | Ishiyama | |
| 2001/0033685 A1 * | 10/2001 | Ishiyama | 382/154 |
| 2002/0097906 A1 | 7/2002 | Ishiyama | |
| 2005/0031194 A1 * | 2/2005 | Lee et al. | 382/154 |

FOREIGN PATENT DOCUMENTS

| | | |
|---|---|---|
| JP | 2002-157595 | 5/2002 |
| JP | 2004-054947 | 2/2004 |
| JP | 2004-086929 | 3/2004 |
| WO | WO 94/23390 A1 | 10/1994 |
| WO | WO 2005/043466 A1 | 5/2005 |

OTHER PUBLICATIONS

Rui Ishiyama et al., Face Recognition Using 3D Shape and Geodesic Illumination Bases, Technical Report of IEICE, vol. 101, No. 58, PRMU2001-13, May 2001, pp. 33-40.

R. Basri et al., "Lambertian Reflectance and Linear Subspaces," IEEE Transactions on Pattern Analysis and Machine Intelligence, vol. 25:2, Feb. 2003, pp. 216-233.

V. Blanz et al., "Face Recognition Based on Fitting a 3D Morphable Model," IEEE Transactions on Pattern Analysis and Machine Intelligence, vol. 25:9, Sep. 2003, pp. 1063-1074.

M. Hamanaka et al., "Face Image Retrieval using 3D Data with Robustness against Pose and Illumination Variations," The Institute of Electronics, Information and Communication Engineers, Sep. 2004, pp. 41-48.

M. Hamanaka et al., "Face Recognition Using Pose-Free Standard Geodesic Weights," The Institute of Electronics, Information and Communication Engineers, Sep. 2003, pp. 61-66.

R. Ishiyama et al., Constructing an Appearance Model on 3D Surface for Face Recognition under Pose and lighting Variations, IPSJ SIG Technical Report, 2003, pp. 61-69.

R. Ishiyama et al., "Geodesic Illumination Basis: Compensating for Illumination Vriations in any Pose for Face Recognition," 2002 IEEE, pp. 297-301.

Bon-Woo Hwang et al., "Reconstruction of Partially Damaged Face Images Based on a Morphable Face Model," IEEE Transactions on Pattern Analysis and Machine Intelligence, vol. 25:3, Mar. 2003, pp. 365-372.

Woo et al., Open GL Programming Guide (Second Edition), Addison-Wesley Publishers, Japan Ltd., pp. 169-211.

* cited by examiner

FIG.10
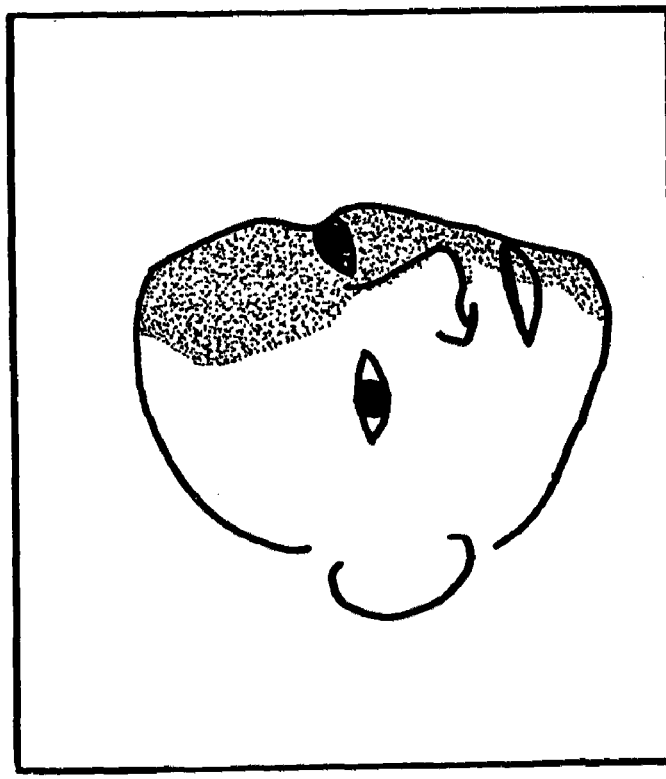
411: INPUT IMAGE
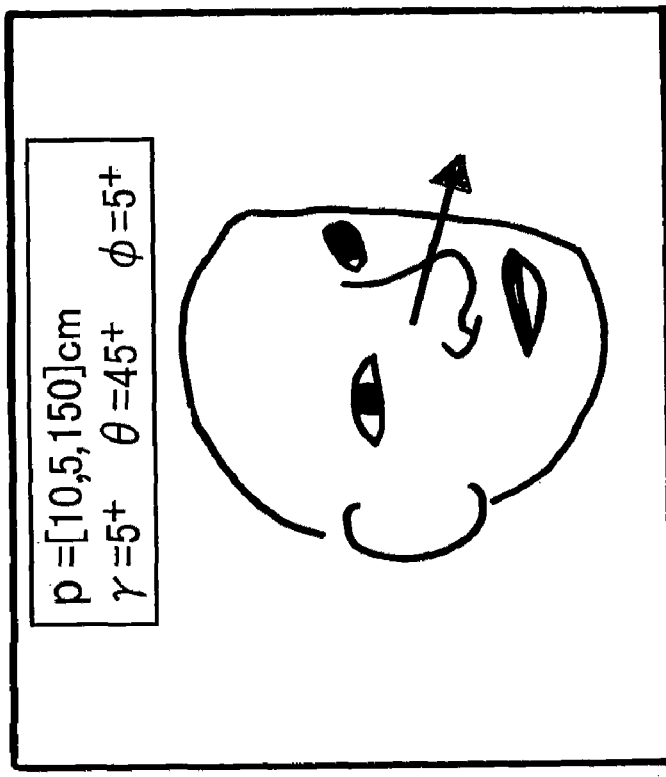
412: CG IMAGE

IMAGE PROCESSING SYSTEM, 3-DIMENSIONAL SHAPE ESTIMATION SYSTEM, OBJECT POSITION/POSTURE ESTIMATION SYSTEM AND IMAGE GENERATION SYSTEM

This application is the National Phase of PCT/JP2006/311087, filed Jun. 2, 2006, which claims priority to Japanese Application No. 2005-164475, filed Jun. 3, 2005, the disclosures of which are hereby incorporated by reference in their entirety.

TECHNICAL FIELD

The present invention relates to an image processing system, image processing method, and image processing program that process an input image. In particular, the present invention relates to a 3-dimensional shape estimation system, object position/posture estimation system, 3-dimensional shape estimation method, and object position/posture estimation method that estimate, from an input image in which the position/posture of an object or illumination condition is unclear, the 3-dimensional shape or position/posture of the object which is seen in the input image and whose shape or texture is unclear. The present invention relates also to an image generation system and image generation method that generate a reproduced image of an input image.

BACKGROUND ART

In recent years, computer graphics (CG) that uses 3-dimensional shape data to generate an image has made progress, and an image close to the actual image can be generated (refer to, e.g., Non-Patent Document 1). In the case where, for example, a CG technique disclosed in Non-Patent Document 1 is used, 3-dimensional shape data (also referred to as "3-dimensional shape") of an individual object and color information (texture) of the surface thereof are prepared. Then, the position/posture with respect to a camera and position, type, and intensity of illumination which exists in a shooting environment are specified, whereby an image close to the actual image can be generated.

In general, in the case where an image of an object for which no blueprint exists, such as a face of human being, is generated, it is necessary to use a special measurement apparatus in order to obtain the 3-dimensional shape and texture of an individual object. In view of this, a method is developed in which a predetermined deformation model is previously prepared and 3-dimensional shape and texture are generated based on the deformation model. More specifically, in this case, a certain number of object sets similar to faces of various persons are measured so as to prepare a generalized deformation model. Then, adequate numeral parameters are given to the prepared generalized deformation model, whereby the 3-dimensional shape and texture of an individual object that has not been measured are generated.

An example of a technique that uses a predetermined deformation model to estimate the 3-dimensional shape and texture is disclosed in, e.g., Non-Patent Document 2. In the technique disclosed in Non-Patent Document 2, the 3-dimensional shape and texture of a large number of faces of persons are previously measured using a 3-dimensional shape measurement apparatus and, based on the measured data sets, a generalized 3-dimensional face model from which the 3-dimensional shape and texture of an unmeasured face of a given person can be formed is generated. More specifically, the generalized face model stores average values of the 3-dimensional shape and texture of faces of a large number of persons, respectively, and a basis vector set representing the change amounts from these average values. Then, values obtained by multiplying the basis vector set by coefficient parameters are respectively added to the average values, whereby the 3-dimensional shape and texture of the generalized face model is approximate to those of a face of a given person. That is, simply by specifying parameters of the shape and texture respectively, the 3-dimensional shape and texture of a face of a given person can be obtained.

By combining the generalized face model disclosed in Non-Patent Document 2 and CG technique disclosed in Non-Patent Document 1, a desired image for an object can be reproduced. More specifically, by specifying parameters of the 3-dimensional shape, texture, position/posture, and illumination condition, a desired image can be reproduced.

Further, a use of the technique disclosed in Non-Patent Document 2 also allows estimation of the 3-dimensional shape and texture of a given individual object from one input image of the individual object. FIG. 11 is a block diagram showing an example of a configuration of a 3-dimensional shape estimation system that estimates the 3-dimensional shape of an object based on a generalized face model. As shown in FIG. 11, a 3-dimensional shape estimation system based on a conventional generalized face model includes a generalized face model generation means 900, an illumination condition initial value input means 901, a position/posture initial value input means 902, a face model generation means 903, a perspective transformation means 904, a shade and shadow generation means 905, and a parameter update means 906. The conventional 3-dimensional shape estimation system having the above configuration operates as follows.

The generalized face model generation means 900 previously generates a generalized face model (also referred to as "generalized 3-dimensional face model"). Further, the generalized face model generation means 900 outputs the generated generalized 3-dimensional face model to the face model generation means 903.

The illumination condition initial value input means 901 inputs, as an initial value, the approximate value of an illumination parameter representing a state of the illumination at the photographing time of an input image showing an object whose 3-dimensional shape is to be estimated. For example, the illumination condition initial value input means 901 sets the direction of one infinite point light source as $(1\theta, 1\phi)$ and inputs, as an illumination parameter, a 3-dimensional direction vector l of the point light source, intensity L thereof, and a value a representing the intensity of diffusion light.

The following is an example of an input method using the illumination condition initial value input means 901. First, an input image and a 3-dimensional image generated using the CG technique disclosed in Non-Patent Document 1 are displayed side-by-side on a screen of a computer terminal. Then, while viewing the screen of the computer terminal, a user (e.g., operator) manually makes an adjustment such that the shade and shadow of the 3-dimensional image becomes as similar as possible to those of the input image. As described above, the illumination parameter can manually be input by the user.

The position/posture initial value input means 902 inputs, as an initial value, the approximate value of a parameter (referred to as "position/posture parameter") representing the position and posture of an object shown in an input image. For example, assuming that the position of an object is represented by 3-dimensional coordinate vector o and direction of the object is represented by rotation angles $\gamma$, $\theta$, and $\phi$ about x, y, and z axes, the position/posture initial value input means 902 inputs, as the position/posture parameter, a matrix R representing the rotation of each of the rotation angles γ, θ, and φ.

The following is an example of an input method using the position/posture initial value input means 902. First, an input image and a 3-dimensional image generated using the CG technique disclosed in Non-Patent Document 1 are displayed side-by-side on a screen of a computer terminal. Then, while viewing the screen of the computer terminal, a user manually makes an adjustment such that the direction of the 3-dimensional image becomes as similar as possible to that of the input image. As described above, the position/posture parameter can manually be input by the user. Alternatively, the following input method can be adapted. The user selects the position of a characteristic part of an object so as to input the position on the image of the selected part. Then, the user selects the 3-dimensional coordinate data of the part corresponding to the input position from the previously stored 3-dimensional coordinate data of respective parts and uses it to calculate the position/posture parameter of the object.

The face model generation means 903 stores a generalized 3-dimensional face model previously calculated by the generalized face model generation means 900. Further, the face model generation means 903 inputs 3-dimensional shape parameter and texture parameter and uses the generalized 3-dimensional face model to calculate individual 3-dimensional shape and individual texture data specific to a person described in the input parameters for output.

The generalized 3-dimensional face model consists of an average value {bar S, bar T} obtained from the 3-dimensional shape $\{S_i'\}$ and texture data $\{T_i'\}$ of a large number (e.g., about 200) of persons and basis vector set $\{S_j, T_j\}$ representing deviation from the average value. The generalized face model generation means 900 first creates a matrix (covariance matrix) S in which 3-dimensional shape vectors from which the average value have been subtracted are arranged using the following expression (1).

[Numeral 1]

$$S=[(S_1'-\bar{S}),(S_2'-\bar{S}),\ldots,(S_n'-\bar{S})] \quad \text{expression (1)}$$

Further, the generalized face model generation means 900 calculates eigenvalues and eigenvectors of the covariance matrix S and stores $n_p$ (e.g., 100) basis vector set $\{S_j\}$ in the descending order of the calculated eigenvalues $\sigma_{S,i}^2$. This is equivalent to that the generalized face model generation means 900 performs approximation shown in the following expression (2) with a matrix having $n_p$ eigenvalues as diagonal components being $\Sigma_s$, and matrix in which the basis vector sets $\{S_j\}$ are arranged being $V_s$.

[Numeral 2]

$$S=U_s \Sigma_s V_s^T \quad \text{expression (2)}$$

Further, the generalized face model generation means 900 performs calculation with respect to the texture in a manner entirely similar to the case of the 3-dimensional shape data to thereby obtain about 100 eigenvalues $\sigma_{T,i}^2$ and basis vector $\{T_j\}$ for storage.

According to the calculations described above, a generalized 3-dimensional face model can be obtained from the basis vector and eigenvalue data that the generalized face model generation means 900 has calculated.

Assuming that a vector S in which the 3-dimensional coordinate values $(x_i, y_i, z_i)$ of respective points i on the surface of the face is $[x_0, y_0, z_0, x_1, y_1, z_1, \ldots, x_n, y_n, z_n]^T$ and vector T in which the luminance values $t_i$ of the texture is $[t_0, t_1, \ldots, t_n]$, the 3-dimensional shape data of a face of a given person is represented by the following expression (3).

[Numeral 3]

$$S = \bar{S} + \sum_j s_j S_j, \quad T = \bar{T} + \sum_j t_j T_j \quad \text{expression (3)}$$

In the above expression 3, $\{s_j\}$ is a shape parameter, $\{t_j\}$ is a texture parameter. That is, the face model generation means 903 inputs the shape parameter $\{s_j\}$ and texture parameter $\{t_j\}$ and uses the expression (3) to calculate an individual 3-dimensional shape S and individual texture T for output. The 3-dimensional shape estimation system shown in FIG. 11 is, as described later, repeatedly performs update of respective parameters and outputs parameter values satisfying a predetermined convergence condition as a 3-dimensional shape estimation result. In this case, at the initial processing time of the update processing thus repeatedly performed, the face model generation means 903 uses 0 as the initial values of the shape and texture parameters to calculate the individual 3-dimensional shape S and individual texture T.

The perspective transformation means 904 receives as an input the individual 3-dimensional shape S, individual texture T, and position/posture parameters of the object and calculates a correspondence table representing to which pixels constituting an image to be reproduced respective data points in a 3-dimensional shape correspond. Assuming that the focal length of a camera photographing an input image is f and center of the input image is $(c_u, c_v)$, the perspective transformation means 904 calculates the image coordinate $(u_i, v_i)$ of a point i on the 3-dimensional face model using the following expression (4).

[Numeral 4]

$$u_i = c_u + f\frac{X}{Z}, \quad v_i = c_v + f\frac{Y}{Z} \quad \text{expression (4)}$$

$$\begin{bmatrix} X \\ Y \\ Z \end{bmatrix} = R \begin{bmatrix} x_i \\ y_i \\ z_i \end{bmatrix} + 0$$

The perspective transformation means 904 divides the entire surface of the 3-dimensional shape into triangular polygons, calculates $(u_i, v_i)$ of respective apexes of the polygons. After that the perspective transformation means 904 fills the interior of the polygons with points and performs hidden surface removal processing using a value of Z. The hidden surface removal processing, which is a standard method of a CG technique, can be carried out by using various graphics library programs. As a result of the hidden surface removal processing, the perspective transformation means 904 can obtain the correspondence table representing correspondence between each pixel i constituting the reproduced image and polygon j.

The shade and shadow generation means 905 receives as an input the individual 3-dimensional shape, correspondence table, and individual texture and calculates the luminance values of respective pixels constituting the reproduced image. The shade and shadow generation means 905 can perform shadow generation processing by using, e.g., a standard method of the CG technique described in Non-Patent Document 1. First, the shade and shadow generation means 905 calculates a normal vector $n_i$ for each data point i on the individual 3-dimensional shape S. Assuming that, on the object surface, the data points of two apexes other than the point i in the same triangular polygon is (j, k) in the counter-clockwise order and 3-dimensional vector representing a 3-dimensional coordinate of a point (i, j, k) is $p_i$, $p_j$, $p_k$, the shade/shadow generation means 905 can calculate the normal vector $n_i$ using the following expression (5).

[Numeral 5]

$$n_i = \frac{(P_j - P_i) \times (P_k - P_i)}{|(P_j - P_i) \times (P_k - P_i)|} \qquad \text{expression (5)}$$

Further, after calculating the normal vectors of all data points, the shade and shadow generation means 905 uses Phong Reflection Model to calculate the luminance value $I_i$ of a pixel according to the following expression (6) (refer to Non-Patent Document 1).

$$I_i = (a + \text{Ln}_j l) T_j) + c_j k L(r_j v_j) v$$

$$r_j = 2(n_j l) n_j - 1 \qquad \text{expression (6)}$$

In the above expression (6), $T^{(j)}$ is a texture luminance value of a polygon j corresponding to the pixel i, which is indicated by the correspondence table, k is a specular reflection constant (fixed value), visa specular reflection characteristic (fixed value), and $c_j$ is a value indicating whether the polygon j is directed to light source direction l or covered by shadow and assumes 0 or 1. The shade and shadow generation means 905 performs calculation using a standard method of a CG technique such as a ray tracing method to thereby determine cast shadow.

According to the above processing, the shade and shadow generation means 905 calculates the luminance value for each pixel constituting a reproduced image and, based on the calculation result, generates a reproduced image. In the following, a vector in which the luminance values of pixels each having a corresponding shape data point are arranged is set as $I_{model} = (I_0, I_1, \ldots, I_n)$, and a vector in which the luminance values of the input image corresponding to respective pixels are arranged is set as $I_{input}$.

The parameter update means 906 compares the input image and reproduced image generated by the shade and shadow generation means 905 and changes parameters of the position/posture, illumination, 3-dimensional shape, and texture such that the reproduced image becomes close to the input image. The 3-dimensional shape estimation system repeatedly executes the processing using the face model generation means 903, perspective transformation means 904, shade and shadow generation means 905, and parameter update means 906 so as to find optimum parameter values.

The parameter update means 906 first calculates a cost function $E_I$ concerning the similarity between images using the following expression (7).

$$E_I = |I_{model} - I_{input}|^2 \qquad \text{expression (7)}$$

Then, the parameter update means 906 calculates a cost function E with respect to the shape parameter and texture parameter according to the prior probability distribution of the model using the following expression (8).

[Numeral 6]

$$E = \frac{1}{\sigma_I^2} E_I + \sum_i \frac{s_i}{\sigma_{s,i}^2} + \sum_i \frac{t_i}{\sigma_{T,i}^2} \qquad \text{expression (8)}$$

The parameter update means 906 searches for such parameters as to minimize the cost function E using a probabilistic descent method. To this end, the parameter update means 906 calculates a differential value J of E for each of shape, texture, illumination, and position/posture parameters using the following expression (9).

[Numeral 7]

$$J = \qquad \text{expression (9)}$$

$$\left[\left\{\frac{dE}{ds_i}\right\}, \left\{\frac{dE}{dt_i}\right\}, \frac{dE}{dl_\theta}, \frac{dE}{dl_\phi}, \frac{dE}{dL}, \frac{dE}{da}, \frac{dE}{dp}, \frac{dE}{d\theta}, \frac{dE}{d\gamma}, \frac{dE}{d\phi}\right]$$

Assuming that a vector in which all parameters are arranged is $\alpha = [s_i, t_i, l_\theta, l_\phi, a, p, \theta, \gamma, \phi]$, the parameter update means 906 updates the current parameter with a new value $\alpha^*$ using the following expression (10).

$$\alpha^* = \alpha - (J^T J)^{-1} J E \qquad \text{expression (10)}$$

When the update amount of each of the calculated parameters is smaller than a previously set threshold value, the parameter update means 906 determines that the repetitive processing has converged and ends the processing. Further, in the case where the error between the reproduced image generated using the updated parameters and input image does not become smaller than that between the reproduced image generated using the parameters before update and input image, the parameter update means 906 determines that the repetitive processing has converged and ends the processing. The 3-dimensional shape estimation system then outputs, as a 3-dimensional shape estimation result, an individual 3-dimensional shape at the time when a reproduced image closest to the input image is obtained in the course of the repetitive processing.

Non-Patent Document 1: Manson Woo, Jackie Neider, Tom Davis, "Open GL Programming Guide (Second edition)" Addison-Wesley Publishers Japan Ltd, p. 169-195

Non-Patent Document 2: Volker Blanz, Thomas Vetter, "Face Recognition Based on Fitting a 3-dimensional Morphable Model", PAMI, 2003, vol. 25, No. 9, pp. 1063-1074.

DISCLOSURE OF THE INVENTION

Problems to be Solved by the Invention

A first problem of the conventional 3-dimensional shape estimation system shown in FIG. 11 lies in that it is necessary to input the initial value of the illumination parameter. This input of the initial value of the illumination parameter places a heavy burden on a user (operator). The illumination parameter is a physical parameter representing the intensity of a diffusion light source and direction and intensity of a point light source and therefore must describe the actual illumination environment under which the input image is photographed. In general, the position/posture parameter of an object is easily understood in an intuitive manner, so that it is not difficult to input the initial value of the position/posture parameter. On the other hand, however, since there exist various types of light sources in many positions in an actual photographing environment, it is difficult and troublesome for the user (operator) to determine an illumination parameter value approximating the photographing environment.

A second problem of the conventional 3-dimensional shape estimation system lies in that a relationship between the luminance value of an image to be generated and illumination parameter is nonlinear, which results in a heavy processing load. That is, a lot of repetitive processings need to be performed in order to search for the optimum parameters for a nonlinear model, resulting in an increase in processing time and processing load. Further, since a lot of repetitive processings need to be performed, it is likely that the search procedure falls into a local solution, making it difficult to correctly estimate optimum parameters.

A third problem of the conventional 3-dimensional shape estimation system lies in that it is necessary to perform calculation processing of a normal vector in order to reproduce the shade using a CG technique and to perform ray trace processing in order to generate the shadow, resulting in an increase in processing load. That is, a large number of calculations are required in the normal vector calculation processing and ray trace processing, thus increasing processing time and processing load. Further, in the case of the 3-dimensional shape estimation system shown in FIG. 11, generation of an image is repeated while a probabilistic descent method is used to change the parameters of a 3-dimensional shape. Therefore, the 3-dimensional shape of an image to be generated and state of the normal vector or shadow are changed every time the image generation processing is repeated.

An object of the present invention is therefore to provide an image processing system, 3-dimensional shape estimation system, object position/posture estimation system, image generation system, image processing method, 3-dimensional shape estimation method, object position/posture estimation method, image generation method, and image processing program capable of processing an image without a need to previously find out the initial value of a parameter representing an illumination condition and without a need for a user to manually input the illumination parameter.

Another object of the present invention is to provide an image processing system, 3-dimensional shape estimation system, object position/posture estimation system, image generation system, image processing method, 3-dimensional shape estimation method, object position/posture estimation method, image generation method, and image processing program capable of reducing the number of times of repetitive processing so as to speed up the processing work as well as avoiding a local solution so as to perform correct estimation of parameters.

Still another object of the present invention is to provide an image processing system, 3-dimensional shape estimation system, object position/posture estimation system, image generation system, image processing method, 3-dimensional shape estimation method, object position/posture estimation method, image generation method, and image processing program capable of speeding up calculation processing of the shade and shadow performed in the image generation. Yet still another object of the present invention is to provide an image processing system, 3-dimensional shape estimation system, object position/posture estimation system, image generation system, image processing method, 3-dimensional shape estimation method, object position/posture estimation method, image generation method, and image processing program capable of performing high-speed calculation of an illumination basis which is required when a linear illumination model is used.

Means for Solving the Problems

An image processing system according to the present invention is characterized by comprising: an individual data generation means (realized by, e.g., a face model generation means 103) for generating individual 3-dimensional shape data representing the 3-dimensional shape of an individual object and individual texture data representing the texture of the individual object based on a 3-dimensional shape parameter and texture parameter using a generalized 3-dimensional object model which is calculated based on 3-dimensional shape data and texture data of a plurality of objects similar to one another; a first illumination basis calculation means (realized by, e.g., an illumination basis calculation means 201) for calculating an individual illumination basis representing a variation in the luminance value of each portion of the 3-dimensional surface of the individual object under various illumination conditions based on the individual 3-dimensional shape data and individual texture data generated by the individual data generation means; a reproduced image generation means (realized by, e.g., an illumination correction means 203) for generating a reproduced image which is an image reproducing the same illumination condition as an input image using the individual illumination basis group calculated by the first illumination basis calculation means; and a parameter update means (realized by, e.g., a parameter update means 204) for repeatedly updating the 3-dimensional shape parameter and texture parameter to be given to the generalized 3-dimensional object model such that the reproduced image generated by the reproduced image generation means is close to the input image until a predetermined convergence condition (for example, until the update amount of each parameter becomes smaller than a predetermined threshold value) is satisfied. The "3-dimensional shape parameter" is a parameter representing what type of deformation is to be given to average shape data and texture data in order to obtain the 3-dimensional shape of an object. The "texture parameter" is a parameter representing what type of change is to be given to average shape data and texture data in order to obtain the texture of an object.

Further, in the image processing system, the first illumination basis calculation means may calculate the individual illumination basis using spherical harmonics based on the individual 3-dimensional shape data generated by the individual data generation means.

Further, in the image processing system, the first illumination basis calculation means may include: an illumination condition setting means (realized by, e.g., a CPU of an information processing apparatus which operates according to a program) for setting a plurality of different illumination conditions; a luminance calculation means (realized by, e.g., a CPU of an information processing apparatus which operates according to a program) for calculating the luminance value of each portion of the surface of the object under various illumination conditions set by the illumination condition setting means; and a calculation means (realized by, e.g., a CPU of an information processing apparatus which operates according to a program) for calculating the individual illumination basis group based on the luminance value calculated by the luminance calculation means.

Further, an image processing system according to the present invention is characterized by comprising: an individual data generation means for generating individual 3-dimensional shape data representing the 3-dimensional shape of an individual object and individual texture data representing the texture of the individual object based on a 3-dimensional shape parameter and texture parameter using a generalized 3-dimensional object model which is calculated based on 3-dimensional shape data and texture data of a plurality of objects similar to one another; a generalized illumination basis model generation means (realized by, e.g., a generalized illumination basis model generation means 300) for generating a generalized illumination basis model which corresponds to the generalized 3-dimensional object model and is used for generating illumination basis representing a basic variation in a reflection state caused due to a difference in the direction or intensity of illumination projected onto an individual object; and a second illumination basis calculation means (realized by, e.g., an illumination basis model calculation means 301) for calculating an individual illumination basis representing a variation in the luminance value of each portion of the 3-dimensional surface of the individual object under various illumination conditions using the generalized illumination basis model generated by the generalized illumination basis model generation means.

Further, the image processing system may include an output means for outputting the individual 3-dimensional shape data generated by the individual data generation means and individual illumination basis generated by the second illumination basis calculation means.

Further, the image processing system may include a reproduced image generation means for generating a reproduced image which is an image reproducing the same illumination condition as an input image using the individual illumination basis group calculated by the second illumination basis calculation means; and a parameter update means for repeatedly updating the 3-dimensional shape parameter and texture parameter to be given to the generalized 3-dimensional object model such that the reproduced image generated by the reproduced image generation means is close to the input image until a predetermined convergence condition is satisfied.

Further, in the image processing system, the second illumination basis calculation means may calculate the individual illumination basis corresponding to the individual 3-dimensional shape data that the generalized illumination basis model generation means generates using the generalized 3-dimensional object model by using the same parameter as the 3-dimensional shape parameter to be given to the generalized 3-dimensional object shape model.

Further, in the image processing system, the generalized illumination basis model generation means may include: a parameter setting means (realized by, e.g., a sample parameter setting means 3001) for setting a random 3-dimensional shape parameter to be given to the generalized 3-dimensional object model; a third illumination basis calculation means (realized by, e.g., an illumination basis calculation means 3002) for calculating the illumination basis groups corresponding to the respective parameters based on the sample 3-dimensional shape group which is generated by giving the parameters set by the parameter setting means to the generalized 3-dimensional object model; and a basis calculation means (realized by, e.g., a basis model calculation means 3003) for calculating the basis vector of the generalized illumination basis model using the illumination basis group calculated by the third illumination basis calculation means and the basis vector and eigenvalue of the generalized 3-dimensional object model.

Further, in the image processing system, the third illumination basis calculation means may calculate the individual illumination basis using spherical harmonics based on the individual 3-dimensional shape data.

Further, in the image processing system, the third illumination basis calculation means may include: an illumination condition setting means (realized by, e.g., a CPU of an information processing apparatus which operates according to a program) for setting a plurality of different illumination conditions; a luminance calculation means (realized by, e.g., a CPU of an information processing apparatus which operates according to a program) for calculating the luminance value of each portion of the surface of the object under various illumination conditions set by the illumination condition setting means; and a calculation means (realized by, e.g., a CPU of an information processing apparatus which operates according to a program) for calculating the individual illumination basis group based on the luminance value calculated by the luminance calculation means by main component analysis.

A 3-dimensional shape estimation system according to the present invention is a system that uses the image processing system and estimates the position and posture shape of an object, the system being characterized by comprising a shape output means (realized by, e.g., an output means provided in an information processing apparatus embodying the image processing system) for outputting, when a predetermined convergence condition is satisfied, a 3-dimensional shape generated by the generalized 3-dimensional object model based on the 3-dimensional shape parameter and texture parameter obtained at their convergence time.

An object position/posture estimation system according to the present invention is a system that uses the image processing system and estimates the 3-dimensional shape of an object, the system being characterized by comprising a position/posture output means (realized by, e.g., an output means provided in an information processing apparatus embodying the image processing system) for outputting, when a predetermined convergence condition is satisfied, a position/posture parameter representing the position and posture of an object obtained at its convergence time.

An image generation system according to the present invention is a system that uses the image processing system and generates a reproduced image which is an image reproducing the same illumination condition as an input image, the system being characterized by comprising an image output means (realized by, e.g., an output means provided in an information processing apparatus embodying the image processing system) for outputting, when a predetermined convergence condition is satisfied, a reproduced image obtained at its convergence time.

An image processing method according to the present invention is characterized by comprising: an individual data generation step of generating individual 3-dimensional shape data representing the 3-dimensional shape of an individual object and individual texture data representing the texture of the individual object based on a 3-dimensional shape parameter and texture parameter using a generalized 3-dimensional object model which is calculated based on 3-dimensional shape data and texture data of a plurality of objects similar to one another; a first illumination basis calculation step of calculating an individual illumination basis representing a variation in the luminance value of each portion of the 3-dimensional surface of the individual object under various illumination conditions based on the generated individual 3-dimensional shape data and individual texture data; a reproduced image generation step of generating a reproduced image which is an image reproducing the same illumination condition as an input image using the calculated individual illumination basis group; and a parameter update step of repeatedly updating the 3-dimensional shape parameter and texture parameter to be given to the generalized 3-dimensional object model such that the generated reproduced image is close to the input image until a predetermined convergence condition is satisfied.

Further, in the image processing method, the first illumination basis calculation step may calculate the individual illumination basis using spherical harmonics based on the individual 3-dimensional shape data generated in the individual data generation step.

Further, in the image processing method, the first illumination basis calculation step may set a plurality of different illumination conditions, calculate the luminance value of each portion of the surface of the object under the set various illumination conditions, and calculate the individual illumination basis group based on the calculated luminance value.

Further, an image processing method according to the present invention is characterized by comprising: an individual data generation step of generating individual 3-dimensional shape data representing the 3-dimensional shape of an individual object and individual texture data representing the texture of the individual object based on a 3-dimensional shape parameter and texture parameter using a generalized 3-dimensional object model which is calculated based on 3-dimensional shape data and texture data of a plurality of objects similar to one another; a generalized illumination basis model generation step of generating a generalized illumination basis model which corresponds to the generalized 3-dimensional object model and is used for generating illumination basis representing a basic variation in a reflection state caused due to a difference in the direction or intensity of illumination projected onto an individual object; and a second illumination basis calculation step of calculating an individual illumination basis representing a variation in the luminance value of each portion of the 3-dimensional surface of the individual object under various illumination conditions using the generated generalized illumination basis model.

Further, the image processing method may include an output step of outputting the individual 3-dimensional shape data generated in the individual data generation step and individual illumination basis generated in the second illumination basis calculation step.

Further, the image processing method may include: a reproduced image generation step of generating a reproduced image which is an image reproducing the same illumination condition as an input image using the individual illumination basis group calculated in the second illumination basis calculation step; and a parameter update step of repeatedly updating the 3-dimensional shape parameter and texture parameter to be given to the generalized 3-dimensional object model such that the generated reproduced image is close to the input image until a predetermined convergence condition is satisfied.

Further, in the image processing method, the second illumination basis calculation step may calculate the individual illumination basis corresponding to the individual 3-dimensional shape data that the generalized illumination basis model generation step generates using the generalized 3-dimensional object model by using the same parameter as the 3-dimensional shape parameter to be given to the generalized 3-dimensional object shape model.

Further, the image processing method may include: a parameter setting step of setting a random 3-dimensional shape parameter to be given to the generalized 3-dimensional object model; a third illumination basis calculation step of calculating the illumination basis groups corresponding to the respective parameters based on the sample 3-dimensional shape group which is generated by giving the set parameters to the generalized 3-dimensional object model; and a basis calculation step of calculating the basis vector of the generalized illumination basis model using the calculated illumination basis group and the basis vector and eigenvalue of the generalized 3-dimensional object model.

Further, in the image processing method, the third illumination basis calculation step may calculate the individual illumination basis using spherical harmonics based on the individual 3-dimensional shape data.

Further, in the image processing method, the third illumination basis calculation step may set a plurality of different illumination conditions, calculate the luminance value of each portion of the surface of the object under the set various illumination conditions, and calculate the individual illumination basis group based on the calculated luminance value by main component analysis.

A 3-dimensional shape estimation method according to the present invention is a method that uses the image processing method and estimates the 3-dimensional shape of an object, the method being characterized by comprising a shape output step of outputting, when a predetermined convergence condition is satisfied, a 3-dimensional shape generated by the generalized 3-dimensional object model based on the 3-dimensional shape parameter and texture parameter obtained at their convergence time.

An object position/posture estimation method according to the present invention is a method that uses the image processing method and estimates the position and posture of an object, the method being characterized by comprising a position/posture output step of outputting, when a predetermined convergence condition is satisfied, a position/posture parameter representing the position and posture of an object obtained at its convergence time.

An image generation method according to the present invention is a method that uses the image processing method and generates a reproduced image which is an image reproducing the same illumination condition as an input image, the method being characterized by comprising an image output step of outputting, when a predetermined convergence condition is satisfied, a reproduced image obtained at its convergence time.

An image processing program according to the present invention allows a computer to execute: individual data processing that generates individual 3-dimensional shape data representing the 3-dimensional shape of an individual object and individual texture data representing the texture of the individual object based on a 3-dimensional shape parameter and texture parameter using a generalized 3-dimensional object model which is calculated based on 3-dimensional shape data and texture data of a plurality of objects similar to one another; first illumination basis calculation processing that calculates an individual illumination basis representing a variation in the luminance value of each portion of the 3-dimensional surface of the individual object under various illumination conditions based on the generated individual 3-dimensional shape data and individual texture data; reproduced image generation processing that generates a reproduced image which is an image reproducing the same illumination condition as an input image using the calculated individual illumination basis group; and parameter update processing that repeatedly updates the 3-dimensional shape parameter and texture parameter to be given to the generalized 3-dimensional object model such that the generated reproduced image is close to the input image until a predetermined convergence condition is satisfied.

Further, an image processing program according to the present invention allows a computer to execute: individual data generation processing that generates individual 3-dimensional shape data representing the 3-dimensional shape of an individual object and individual texture data representing the texture of the individual object based on a 3-dimensional shape parameter and texture parameter using a generalized 3-dimensional object model which is calculated based on 3-dimensional shape data and texture data of a plurality of objects similar to one another; generalized illumination basis model generation processing that generates a generalized illumination basis model which corresponds to the generalized 3-dimensional object model and is used for generating illumination basis representing a basic variation in a reflection state caused due to a difference in the direction or intensity of illumination projected onto an individual object; and second illumination basis calculation processing that calculates an individual illumination basis representing a variation in the luminance value of each portion of the 3-dimensional surface of the individual object under various illumination conditions using the generated generalized illumination basis model.

Advantages of the Invention

According to the present invention, the illumination basis is used to calculate the luminance value of a reproduced image. Since a linear illumination model representing a variation in the image luminance value caused by illumination by a linear sum of the illumination basis is used to execute the processing, it is possible to reproduce the luminance value of an image under any illumination condition without a need to input the initial value of an illumination parameter. Therefore, an image can be processed without a need to previously find out the initial value of a parameter representing an illumination condition and without a need for a user to manually input the illumination parameter. In general, there exist various types of light sources in many positions in an actual photographing environment, so that it is difficult for a user (operator) to input an illumination parameter value approximating the photographing environment as compared to a case of inputting a position/posture parameter value. According to the present invention, it is possible to process an input image without a need for the user to input the initial value of the illumination parameter, thereby reducing an operation load on the user.

Further, according to the present invention, since the linear illumination model is used, it is possible to eliminate a need to search for the illumination parameter using a probabilistic descent method. This eliminates a need to perform nonlinear optimization processing in which image generation processing is repeated for obtaining an optimum illumination parameter. Therefore, it is possible to reduce the number of times of the repetitive processing for estimation of a 3-dimensional shape parameter and texture parameter to thereby increase the processing speed, as well as avoid a local solution to thereby estimate accurate parameters.

Further, in the present invention, by previously calculating the generalized illumination basis model, it is possible to obtain, from the 3-dimensional shape parameter, illumination basis only by performing a simple linear calculation using the calculated generalized illumination basis model. The calculation of the individual illumination basis using the generalized illumination basis model can eliminate a need to perform generation processing of learning images required for calculation of a normal vector or calculation of the individual illumination basis including shadow. Therefore, it is possible to increase the processing speed of calculation of shade and shadow in the image generation process and perform calculation of the illumination basis required when the linear illumination model is used at high speed.

BRIEF DESCRIPTION OF THE DRAWINGS

FIG. 10 is an explanatory view showing an example of an input image and a reproduced image generated from the input image using a CG technique.

EXPLANATION OF REFERENCE SYMBOLS

Figure 1:
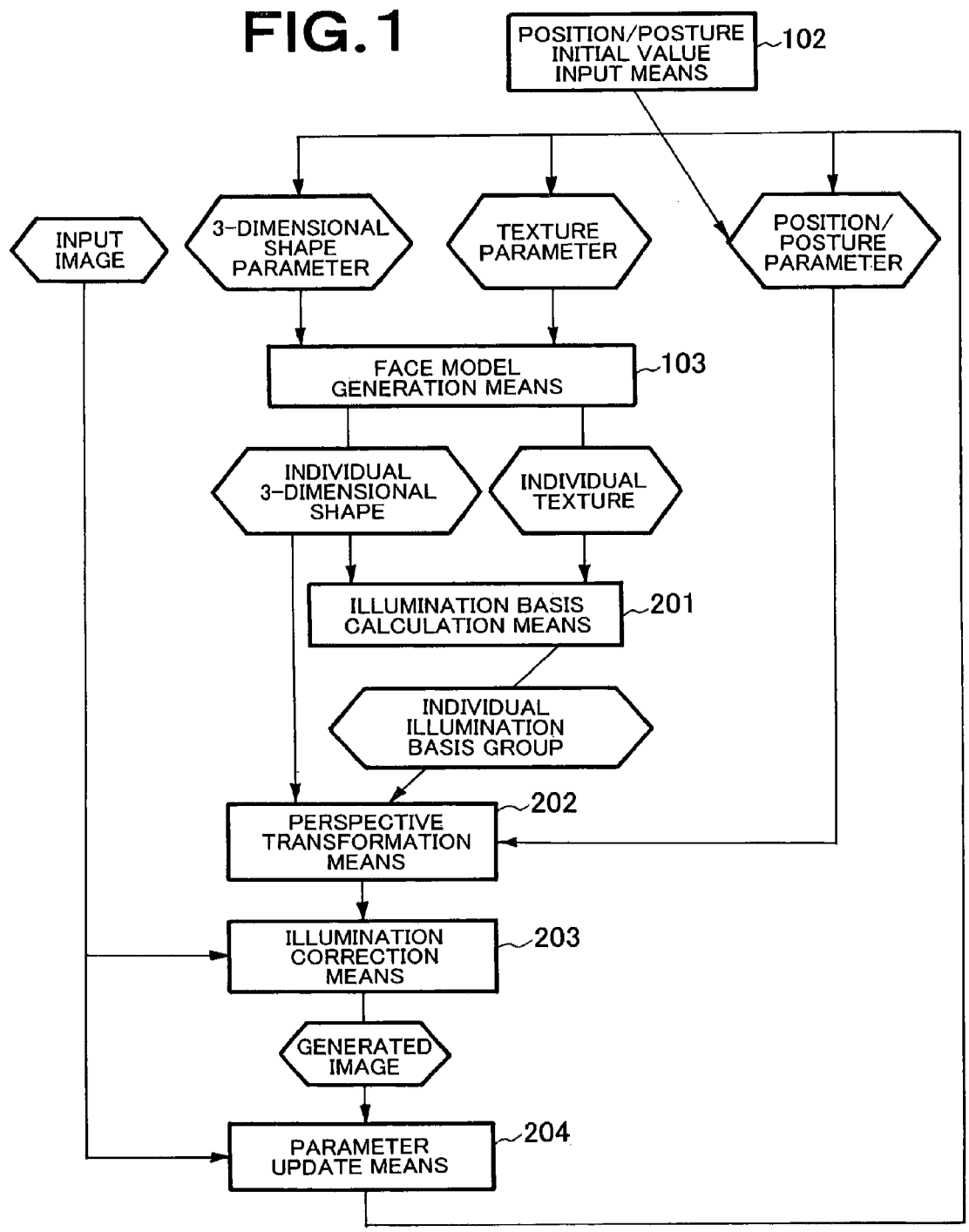
FIG. 1 is a block diagram showing an example of a configuration of an image processing system according to the present invention.

102: Position/posture initial value input means
103: Face model generation means
201: Illumination basis calculation means
202: Perspective transformation means
203: Illumination correction means
204: Parameter update means
300: Generalized illumination basis model generation means
301: Illumination basis model calculation means
401: Image input unit
402: Processing computer
403: Storage unit
404: Storage medium
2011: Normal vector calculation means
2012: Harmonic function calculation means
3001: Sample parameter setting means
3002: Illumination basis calculation means
3003: Basis model calculation means

BEST MODE FOR CARRYING OUT THE INVENTION

First Embodiment

A first embodiment of the present invention will be described below with reference to the accompanying drawings. FIG. 1 is a block diagram showing an example of a configuration of an image processing system according to the present invention. As shown in FIG. 1, the image processing system includes a position/posture initial value input means 102, a face model generation means 103, an illumination basis calculation means 201, a perspective transformation means 202, an illumination correction means 203, and a parameter update means 204.

The image processing system is realized by an information processing apparatus such as a work station or personal computer. In the present embodiment, the image processing system is used as a 3-dimensional shape estimation system that estimates the 3-dimensional shape and texture of an object. Further, the image processing system is used as an object position/posture estimation system that estimates the position and posture of an object. Further, the image processing system is used as an image generation system that generates a predetermined reproduced image (e.g., CG image) of an input image.

Specifically, the position/posture initial value input means 102 is realized by a CPU of an information processing apparatus which operates according to a program and an input device such as a mouse or keyboard. The position/posture initial value input means 102 has a function of inputting the initial value of a position/posture parameter representing the position and posture of an object shown in an input image. For example, assuming that the position of the object is represented by 3-dimensional coordinate o, direction of the object is represented by rotation angles $\gamma$, $\theta$, and $\phi$ about x, y, and z axes, the position/posture initial value input means 102 inputs, as the position/posture parameter, a matrix R representing the rotation of each of the rotation angles $\gamma$, $\theta$, and $\phi$.

At the time of inputting the initial value of the position/posture parameter, the position/posture initial value input means 102 displays a 3-dimensional image generated using a CG technique (also referred to as CG image) and input image side-by-side on a screen of a display unit. In this case, while viewing the display screen, a user (e.g., operator) operates an input device such as a keyboard or mouse to make an adjustment such that the direction of the 3-dimensional image becomes as similar as possible to that of the object in the input image, thereby instructing the input of the initial value of the position/posture parameter. Then, the position/posture initial value input means 102 inputs the initial value of the position/posture parameter according to the user's input instruction.

Specifically, the face model generation means 103 is realized by a CPU of an information processing apparatus which operates according to a program. The face model generation means 103 receives as an input a 3-dimensional shape parameter and texture parameter and uses a generalized face model to calculate an individual 3-dimensional shape representing the 3-dimensional shape of an individual object (person) and an individual texture representing the texture of the individual object.

The "3-dimensional shape parameter" is a parameter representing what type of deformation is to be given to average shape data and texture data in order to obtain the 3-dimensional shape of an object. Concretely, in the present embodiment, the "3-dimensional shape parameter" is a numerical parameter representing what type of deformation is to be given to a normal shape shown in a generalized 3-dimensional face model in order to obtain the 3-dimensional shape of a face of a target person. Further, the "3-dimensional shape parameter" is a parameter for describing the 3-dimensional shape of a face of a person using the generalized 3-dimensional face model.

The "texture parameter" is a parameter representing what type of change is to be given to average shape data and texture data in order to obtain the texture of an object. Concretely, in the present embodiment, the "texture parameter" is a numerical parameter representing what type of change is to be given to a normal texture shown in the generalized 3-dimensional face model in order to obtain the texture of a face of a target person.

Further, the "texture parameter" is a parameter for describing the texture of the surface of a face of a person using the generalized 3-dimensional face model.

The generalized 3-dimensional face model "(generalized 3D face model)" is a model describing, using parameters, the 3-dimensional shape and texture of the surface of a face of various persons. The "generalized 3-dimensional model" consists of the 3-dimensional shape and texture (reflectivity or color) of a face of a standard person and data representing deformation given to the 3-dimensional shape and texture. Concretely, in the present embodiment, the "generalized 3-dimensional model" consists of an average value calculated from the 3-dimensional shape and texture data of a plurality of (e.g., about 200) persons and basis vector group representing deviation from the average value.

In the present embodiment, simply by obtaining the 3-dimensional shape parameter and texture parameter specifying an individual person, it is possible to calculate a face model of the individual person by applying the 3-dimensional shape parameter and texture parameter to the generalized 3-dimensional face model. Hereinafter, to calculate a face model of an individual person by applying the 3-dimensional shape parameter and texture parameter to the generalized 3-dimensional face model is also referred to as "to give the 3-dimensional shape parameter and texture parameter to the generalized 3-dimensional face model".

The image processing system includes, e.g., a generalized face model generation means (not shown) that previously generates the generalized face model. The generalized face model generation means uses the above expressions (1) and (2) to previously generate the generalized 3-dimensional face model according to the same processing as that performed by the generalized face model generation means 900 shown in FIG. 11. Further, the image processing system includes, e.g., a face model storage means (not shown) that stores the generalized 3-dimensional face model generated by the generalized face model generation means. Specifically, the generalized face model generation means is realized by a CPU of an information processing apparatus which operates according to a program. The face model storage means is realized by a database unit such as magnetic disk drive or optical disk drive.

In the present embodiment, the face model generation means 103 uses the generalized 3-dimensional face model that the face model storage means has previously stored to calculate a face model (concretely, individual 3-dimensional shape and individual texture) of an individual person. In this case, the face model generation means 103 uses the above expression (3) to calculate the individual-3-dimensional shape and individual texture according to the same processing as that performed by the face model generation means 903 shown in FIG. 11.

As described later, the image processing system repeatedly performs update processing of respective parameters until a predetermined convergence condition is satisfied so as to estimate respective parameters (3-dimensional shape parameter, texture parameter, and position/posture parameter). In the present embodiment, the face model generation means 103 uses a value of 0 as the initial value of the 3-dimensional shape parameter and texture parameter at the initial processing time of repetitive processing to calculate the individual 3-dimensional shape and individual texture.

Specifically, the illumination basis calculation means 201 is realized by a CPU of an information processing apparatus which operates according to a program. The illumination basis calculation means 201 receives as an input the individual 3-dimensional shape and individual texture calculated by the face model generation means 103 and calculates individual illumination basis which describes a variation in the luminance values of respective positions (polygons) on the surface of an individual object obtained under various illumination conditions. The "illumination basis" is data describing a basic variation of a reflection state (luminance values) due to difference in the direction and intensity of the illumination on a face.

Here, a calculation method of the illumination basis will be described. In general, in the case where the surface reflection characteristics of an object is close to Lambertian (perfect diffusion), it is possible to achieve an approximation to the luminance value of an image under a given illumination condition with a linear sum of at most 9-dimensional illumination basis. As described above, the present embodiment utilizes an advantage that it is possible to represent a variation in the luminance value of an image under a given illumination condition with a linear sum of small number of illumination basis in the case where the reflection characteristics of the object surface can be approximated to perfect diffusion (Lambertian). In the case where the individual 3-dimensional shape of an individual object is known, the illumination basis calculation means 201 calculates a normal vector from the individual 3-dimensional shape data and uses the individual texture to analytically calculate the illumination basis. The above calculation method of the illumination basis is described in, e.g., [Ronen Basri, David W. Jacobs, "Lambertian Reflectance and Linear Subspaces", IEEE Trans. PAMI, 2003, Vol. 25, No. 2, pp. 218-233 (Document A)].

However, in the illumination basis calculation method described in Document A, generation of shadow is ignored. In the case where the illumination basis is generated, when the individual 3-dimensional shape and individual texture are known, it is possible to reproduce shadow, thereby allowing the illumination basis that can meet an image of a given posture to be calculated. The calculation method of the illumination basis capable of reproducing shadow is described in, e.g., [Rui Ishiyama, Shizuo Sakamoto, "Geodesic Illumination Basis: Compensating for Illumination Variations in any Pose for Face Recognition," Proc. of ICPR 2002, vol. 4, pp. 297-301 (Document B).

In the present embodiment, the illumination basis calculation means 201 applies the illumination basis calculation techniques described in Documents A and B to an image processing system (e.g., 3-dimensional shape estimation system) to calculate the individual illumination basis from the individual 3-dimensional shape data and individual texture generated by giving the 3-dimensional shape parameter and texture parameter to the generalized face model.

Figure 2:
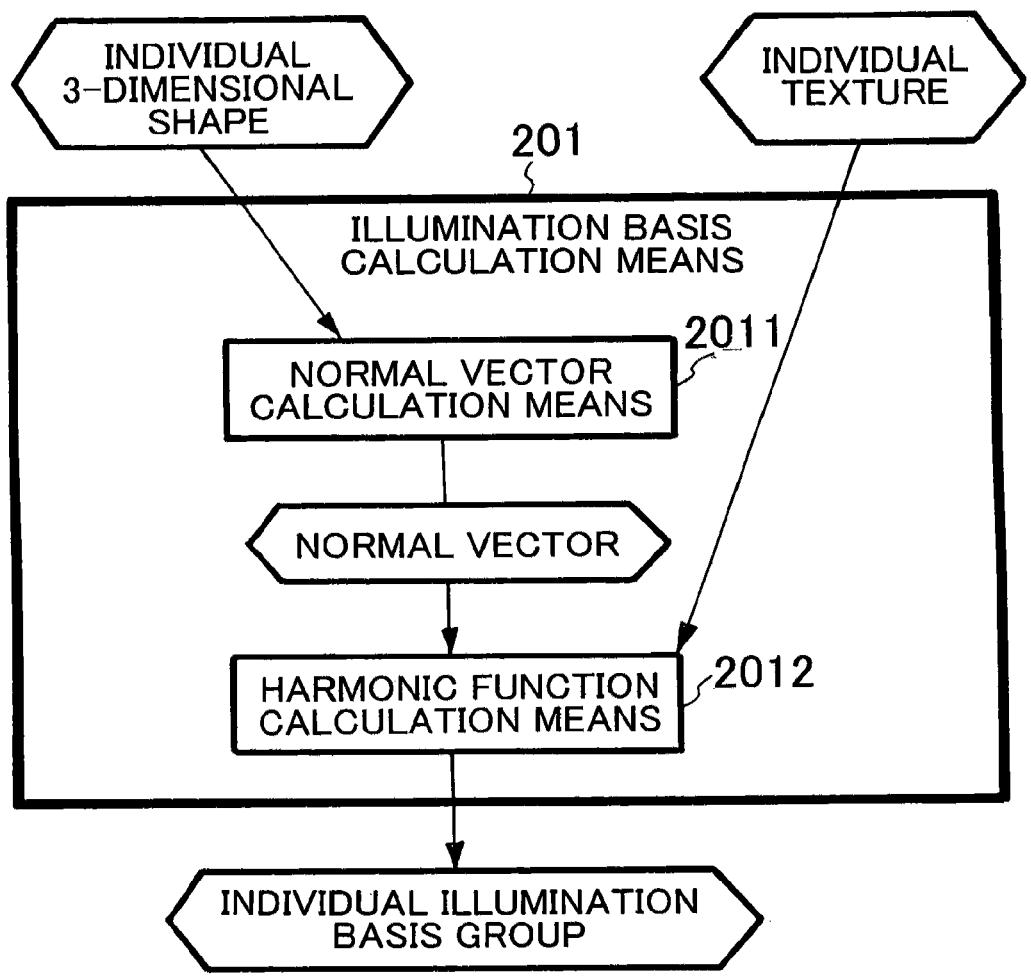
FIG. 2 is a block diagram showing an example of a configuration of an illumination basis calculation means.

FIG. 2 is a block diagram showing an example of a configuration of the illumination basis calculation means 201. As shown in FIG. 2, the illumination basis calculation means 201 includes a normal vector calculation means 2011 and a harmonic function calculation means 2012.

The normal vector calculation means 2011 calculates a normal vector based on the individual 3-dimensional shape calculated by the face model generation means 103. In the present embodiment, the normal vector calculation means 2011 calculates a normal vector $n_i$ for each polygon i in the individual 3-dimensional shape using the following expression (11).

[Numeral 8]

$$n_i = \frac{(P_j - P_i) \times (P_k - P_i)}{|(P_j - P_i) \times (P_k - P_i)|} \qquad \text{expression (11)}$$

The harmonic function calculation means 2012 calculates the individual illumination basis using predetermined spherical harmonics based on the individual 3-dimensional shape and individual texture. In the present embodiment, the harmonic function calculation means 2012 calculates the individual illumination basis using predetermined spherical harmonics based on the normal vector calculated by the normal vector calculation means 2011 and individual texture calculated by the face model generation means 103. Assuming that a component of the polygon of j-th dimensional individual illumination basis is $b_{ji}$, components of the normal vector is $n_i=(x, y, z)$, and texture luminance is $t^{(i)}$, the harmonic function calculation means 2012 can calculate the illumination basis using the following expression (12).

[Numeral 9]

$$[b_{1i}, b_{2i}, \ldots b_{9i}] = \qquad \text{expression (12)}$$
$$t^{(i)}\Big[\Pi Y_{00}\, \frac{2\Pi}{3} Y_{1,-1}\, \frac{2\Pi}{3} Y_{1,0}\, \frac{2\Pi}{3} Y_{1,1}\, \frac{\Pi}{4} Y_{2,-2}\, \frac{\Pi}{4}$$
$$Y_{2,-1}\, \frac{\Pi}{4} Y_{2,0}\, \frac{\Pi}{4} Y_{2,1}\, \frac{\Pi}{4} Y_{2,2}\Big]$$

where, $$Y_{00} = \frac{1}{\sqrt{4\Pi}},\ Y_{1,0} = \sqrt{\frac{3}{4\Pi}}\, z,\ Y_{1,1} = \sqrt{\frac{3}{4\Pi}}\, x,$$

$$Y_{1,-1} = \sqrt{\frac{3}{4\Pi}}\, y,\ Y_{2,0} = \frac{1}{2}\sqrt{\frac{5}{4\Pi}}\, (3z^2 - 1),$$

$$Y_{2,-1} = 3\sqrt{\frac{5}{12\Pi}}\, xz,\ Y_{2,1} = 3\sqrt{\frac{5}{12\Pi}}\, yz,$$

$$Y_{2,-2} = \frac{3}{2}\sqrt{\frac{5}{12\Pi}}\, (x^2 - y^2),\ Y_{2,2} = 3\sqrt{\frac{5}{12\Pi}}\, xy$$

To calculate the illumination basis with the number of dimensions set to 9 in the expression (12) is merely one example. For example, the number of dimensions may be reduced for high-speed calculation. Further, it is possible to increase the number of dimensions for increasing accuracy.

When calculating the individual illumination basis, the illumination basis calculation means 201 first sets various illumination conditions. Then, the illumination basis calculation means 201 calculates the luminance values of respective portions on the surface of an object under the set illumination conditions. Finally, the illumination basis calculation means 201 calculates the individual illumination basis group based on the obtained luminance values.

Specifically, the perspective transformation means 202 is realized by a CPU of an information processing apparatus which operates according to a program. The perspective transformation means 202 uses the 3-dimensional coordinate of 3-dimensional shape data and parameters of position/posture of a face and camera (image pickup means for generating the input image data) to determine correspondence between the position on the 3-dimensional surface and coordinate on the image. For example, the perspective transformation means 202 calculates a correspondence table representing to which pixels constituting a reproduced image respective data points in a 3-dimensional shape correspond. The "reproduced image" is an image that a computer reproduces by calculation using an estimated 3-dimensional face shape, texture, illumination condition, and position/posture to reproduce such that the image is close to the input image. The perspective transformation means 202 further having a function of sorting elements of the illumination basis vector b.

Figure 11:
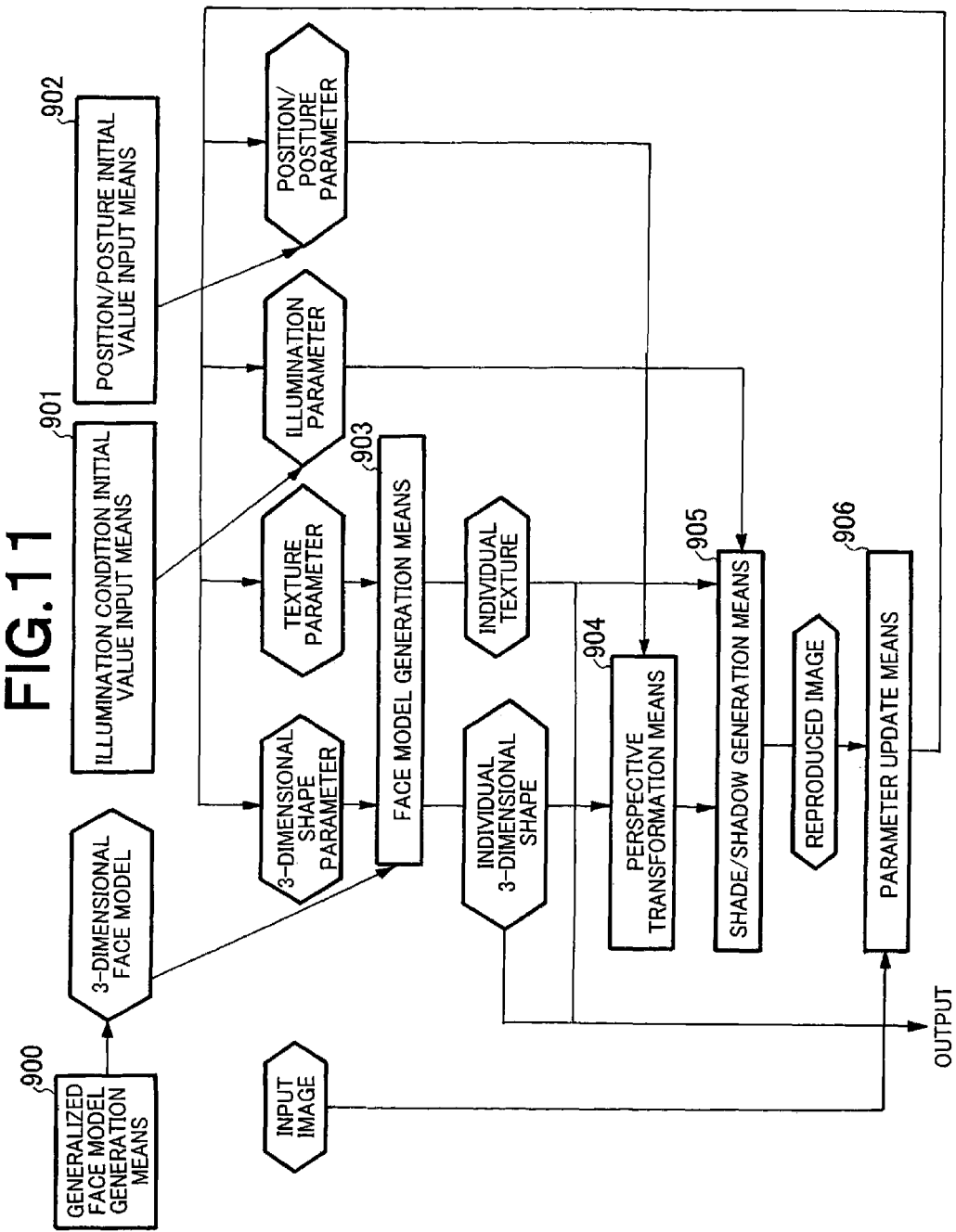
FIG. 11 is a block diagram showing a configuration example of a conventional 3-dimensional shape estimation system.

In the present embodiment, the perspective transformation means 202 receives as an input the individual 3-dimensional shape, individual texture, and position/posture parameters of an object and determines a polygon j of the individual 3-dimensional shape corresponding to each pixel i in the reproduced image by calculation using the above expression (4) according to the same processing as that performed by the perspective transformation means 904 as shown in FIG. 11. That is, the perspective transformation means 202 calculates the image coordinate $(u_i, v_i)$ of a point i on the 3-dimensional face model using the expression (4). Further, the perspective transformation means 202 sets a vector $b_j=[b_{10}, b_{11}, \ldots, b_{1m}]$ in which the illumination basis elements of the polygon corresponding to each pixel in the reproduced image are arranged as a j-th dimensional illumination basis vector and outputs an illumination basis group $\{b_j\}$.

Specifically, the illumination correction means 203 is realized by a CPU of an information processing apparatus which operates according to a program. When calculating the luminance value of the surface of a face in the image by a linear sum of the illumination basis, the illumination correction means 203 corrects the coefficient of the liner sum so that the calculation result corresponds to the shade of the input image. Further, the illumination correction means 203 uses the individual illumination basis group calculated by the illumination basis calculation means 201 to generate a reproduced image which reproduces the same illumination condition as the input image. In the present embodiment, the illumination correction means 203 receives as an input the individual illumination basis group $\{b_j\}$ and input image $I_{input}$ and calculates the luminance value of a reproduced image $I_{model}$ using a linear model shown in the following expression (13).

$$I_{model} = \Sigma_j \lambda_j b_j$$

$$\lambda_j = \mathrm{argmin}(|I_{model} - I_{input}|^2) \quad \text{expression (13)}$$

In the expression (13), $\{\lambda_j\}$ is a coefficient representing illumination. The illumination correction means 203 can uniquely calculate the coefficient $\{\lambda_j\}$ by a linear least-squares method without a need to perform repetitive search processing.

Specifically, the parameter update means 204 is realized by a CPU of an image processing apparatus which operates according to a program. The parameter update means 204 has a function of updating the respective parameters (3-dimensional shape parameter, texture parameter, and position/posture parameter) based on the input image and reproduced image generated by the illumination correction means 203. In the present embodiment, the parameter update means 204 compares the reproduced image $I_{model}$ and input image $I_{input}$ and changes parameters of the position/posture, 3-dimensional shape, and texture such that the reproduced image becomes close to the input image. The image processing system repeatedly executes the processing using the respective means subsequent to the face model generation means 103 so as to find optimum parameter values until a predetermined convergence condition is satisfied.

The parameter update means 204 first calculates a cost function $E_I$ concerning the similarity between images using the above expression (7) according to the same processing as that performed by the parameter update means 906 shown in FIG. 11. The "cost function" is a function representing a cost of error between the reproduced image and input image. In the present embodiment, the "cost function" represents how closely the estimated 3-dimensional face shape, texture, illumination condition, and position/posture of the reproduced image correspond to those of the input image.

Further, the parameter update means 204 searches for such parameters as to minimize the cost function E using a probabilistic descent method. To this end, the parameter update means 204 calculates a differential value of E for each of 3-dimensional shape, texture, and position/posture parameters using the following expression (14).

[Numeral 10]

$$J = \left[\left\{\frac{dE}{ds_i}\right\}, \left\{\frac{dE}{dt_i}\right\}, \frac{dE}{dp}, \frac{dE}{d\theta}, \frac{dE}{d\gamma}, \frac{dE}{d\phi}\right] \quad \text{expression (14)}$$

The parameter update means 204 determines whether the update amount of each of the calculated parameters (3-dimensional shape parameter, texture parameter, and position/posture parameter) is larger than a previously set threshold value. When the update amount of each of the calculated parameters is smaller than the previously set threshold value, the parameter update means 204 determines that the repetitive processing has converged and ends the processing. Further, in the case where the error between the reproduced image generated using the updated parameters and input image does not become smaller than that between the reproduced image generated using the parameters before update and input image, the parameter update means 204 determines that the repetitive processing has converged and ends the processing.

When the image processing system is applied to a 3-dimensional shape estimation system, the image processing system outputs, as a 3-dimensional shape estimation result, an individual 3-dimensional shape and individual texture at the time when a reproduced image closest to the input image is obtained (when the processing has converged) in the course of the repetitive processing. In this case, when determining that the repetitive processing has converged, the parameter update means 204 outputs the updated 3-dimensional shape parameter and texture parameter as a 3-dimensional shape estimation result.

Further, when the image processing system is applied to an object position/posture estimation system, the image processing system outputs, as a position/posture estimation result, position/posture data at the time when a reproduced image closest to the input image is obtained in the course of the repetitive processing. In this case, when determining that the repetitive processing has converged, the parameter update means 204 outputs the updated position/posture parameter as a position/posture estimation result.

Further, when the image processing system is applied to an image generation system, the image processing system outputs a reproduced image closest to the input image among the reproduced images obtained in the course of the repetitive processing. In this case, when the parameter update means 204 determines that the repetitive processing has converged, the illumination correction means 203 outputs the generated reproduced image.

An information processing apparatus embodying the image processing system includes an output means (realized by a CPU and input/output section of an information processing apparatus which operates according to a program) that outputs the 3-dimensional shape estimation result, position/posture estimation result, and reproduced image to a recording medium such as a CD-ROM. An information processing apparatus embodying the image processing system may display the 3-dimensional shape estimation result, position/posture estimation result, and reproduced image on, e.g., a display unit.

Further, in the present embodiment, a storage unit (not shown) of an information processing apparatus embodying the image processing system stores various types of programs for processing input images. For example, the storage unit of an information processing apparatus stores an image processing program allowing a computer to execute: individual data processing that uses a generalized 3-dimensional object model calculated based on 3-dimensional shape data and texture data of a plurality of objects similar to one another to generate individual 3-dimensional shape data representing the 3-dimensional shape of an individual object and individual texture data representing the texture of the individual object based on a 3-dimensional shape parameter and texture parameter; first illumination basis calculation processing that calculates an individual illumination basis representing a variation in the luminance value of each portion of the 3-dimensional surface of the individual object under various illumination conditions based on the generated individual 3-dimensional shape data and individual texture data; reproduced image generation processing that uses the calculated individual illumination basis group to generate a reproduced image which is an image reproducing the same illumination condition as an input image; and parameter update processing that repeatedly updates the 3-dimensional shape parameter and texture parameter to be given to the generalized 3-dimensional face model such that the generated reproduced image is close to the input image until a predetermined convergence condition is satisfied.

Figure 3:
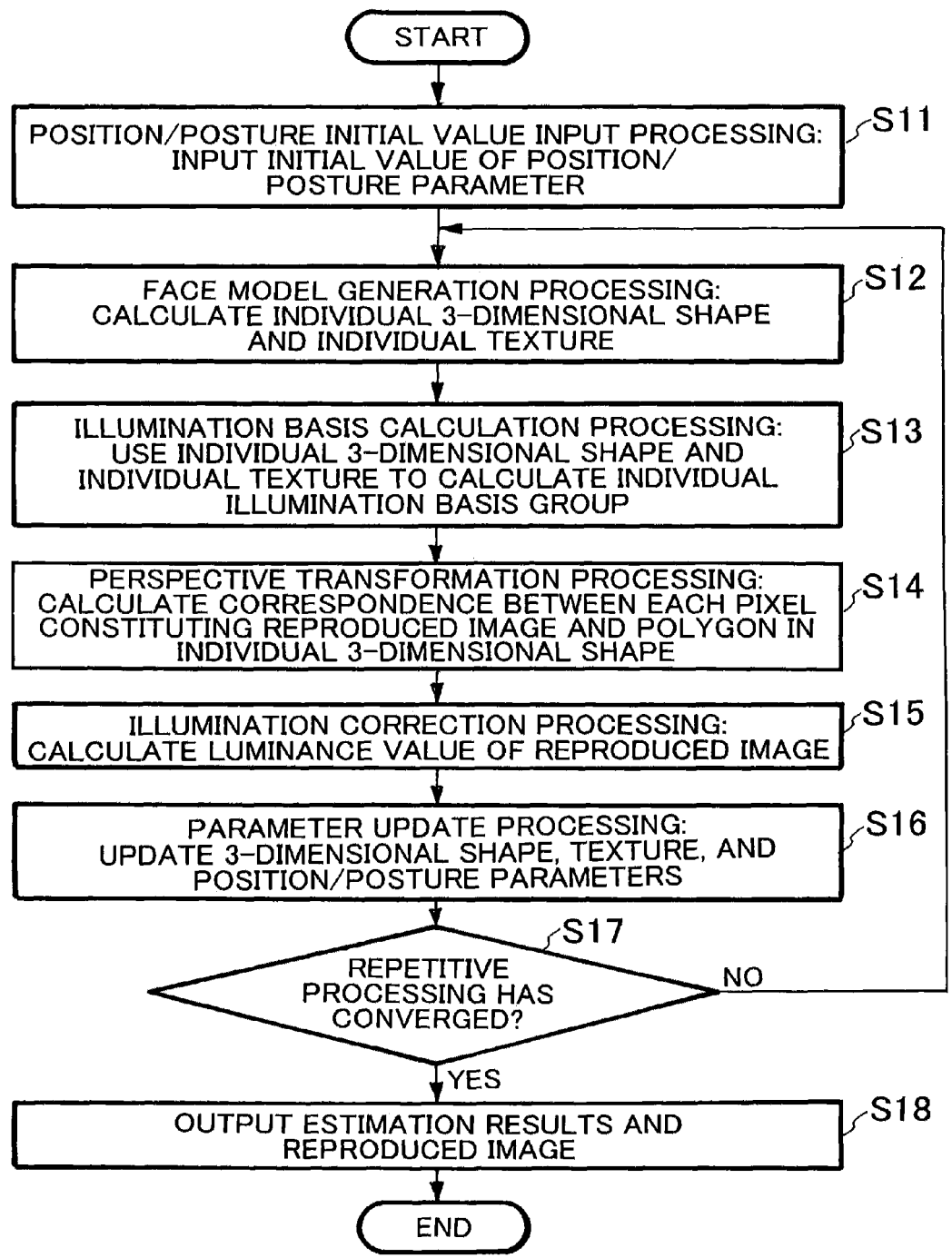
FIG. 3 is a flowchart showing an example of a processing procedure for the image processing system to process an input image so as to calculate respective parameters.

Operation will next be described. FIG. 3 is a flowchart showing an example of a processing procedure for the image processing system to process an input image so as to calculate respective parameters. In the present embodiment, the image processing system includes an image pickup means such as a camera. When photographing an image to be input using the image pickup means according to, e.g., user's photographing operation, the image processing system starts processing of the input image so as to calculate values of the respective parameters. First, the position/posture initial value input means 102 inputs the initial value of the position/posture parameter $\{p, \gamma, \theta, \phi\}$ according to a user's input instruction (step S11).

The face model generation means 103 uses current values of a 3-dimensional shape parameter $\{s_i\}$ and texture parameter $\{t_i\}$ and generalized face model represented by the above expression (3) to calculate an individual 3-dimensional shape and individual texture (step S12). In this case, the face model generation means 103 uses a value of 0 as the initial values of the respective parameters $\{s_i\}$ and $\{t_i\}$ at the initial processing time of repetitive processing to calculate the individual 3-dimensional shape and individual texture.

The illumination basis calculation means 201 uses the individual 3-dimensional shape and individual texture calculated by the face model generation means 103 to calculate a normal vector according to the above expression (11). Further, the illumination basis calculation means 201 calculates an individual illumination basis group according to the above expression (12) (step S13).

The perspective transformation means 202 uses the individual 3-dimensional shape obtained by the face model generation means 103 and a current position/posture parameter to calculate correspondence between each pixel constituting a reproduced image and a polygon in the individual 3-dimensional shape based on the relationship represented by the above expression (4) (step S14). In this case, at the initial processing of repetitive processing, the perspective transformation means 202 uses the initial value of the position/posture parameter input by the position/posture initial value input means 102 to calculate correspondence between each pixel constituting the reproduced image and polygon in the individual 3-dimensional shape. Further, the perspective transformation means 202 calculates a vector group $\{b_j\}$ in which values of the individual illumination basis of the polygon corresponding to each pixel constituting the reproduced image are arranged to generate an individual illumination basis image group.

The illumination correction means 203 uses an input image $I_{input}$ and individual illumination basis group generated by the illumination basis calculation means 201 to calculate a luminance value $I_{model}$ of the reproduced image according to the above expression (13) (step S15).

The parameter update means 204 uses the input image $I_{input}$, reproduced image $I_{model}$ generated by the illumination correction means 203, and eigenvalues $\sigma_{si}$, $\sigma_{ti}$ of a generalized face model to calculate a cost function E. Further, the parameter update means 204 updates the respective parameters of the 3-dimensional shape, texture, and position/posture) so as to minimize the cost function E using a probabilistic descent method (step S16).

The parameter update means 204 determines whether the parameter search using the probabilistic descent method has converged (step S17). More specifically, when a difference between each new parameter after update and each original parameter before update is smaller than a previously set threshold value, the parameter update means 204 determines that the repetitive processing has converged and ends the processing. Further, when the value of the cost function E is not smaller than that before parameter update, the parameter update means 204 determines that the repetitive processing has converged and ends the processing. When the repetitive processing has not converged, the processing flow returns to step S12 where the image processing system repeats the processing of step S12 and subsequent processing using an updated parameter $\alpha^*$.

When it is determined that the repetitive processing has converged, the image processing system outputs, as estimation results, updated respective parameters (3-dimensional shape parameter, texture parameter, and position/posture parameter) and reproduced image (step S18). For example, the image processing system outputs the updated respective parameters and reproduced image to a storage medium such as a CD-ROM. Further, for example, the image processing system displays the updated respective parameters and reproduced image on a display unit.

As described above, according to the present embodiment, the image processing system includes the illumination basis calculation means 201 and illumination correction means 203 and uses the illumination basis to calculate the luminance value of the reproduced image. Thus, the image processing system is so constructed as to calculate the luminance value of the reproduced image without using an illumination parameter, eliminating a need for a user to input the initial value of the illumination parameter. Therefore, it is possible to process an image without a need to previously find out the initial value of a parameter representing an illumination condition and without a need for a user to manually input the illumination parameter.

Further, according to the present embodiment, it is possible to eliminate a need to search for the illumination parameter using a probabilistic descent method to thereby reduce the number of times of the repetitive processing and avoid a local solution, which increases estimation accuracy of respective parameters. That is, it is possible to reduce the number of times of the repetitive processing to thereby speed-up the processing, as well as to avoid a local solution to thereby estimate accurate parameters.

Second Embodiment

Figure 4:
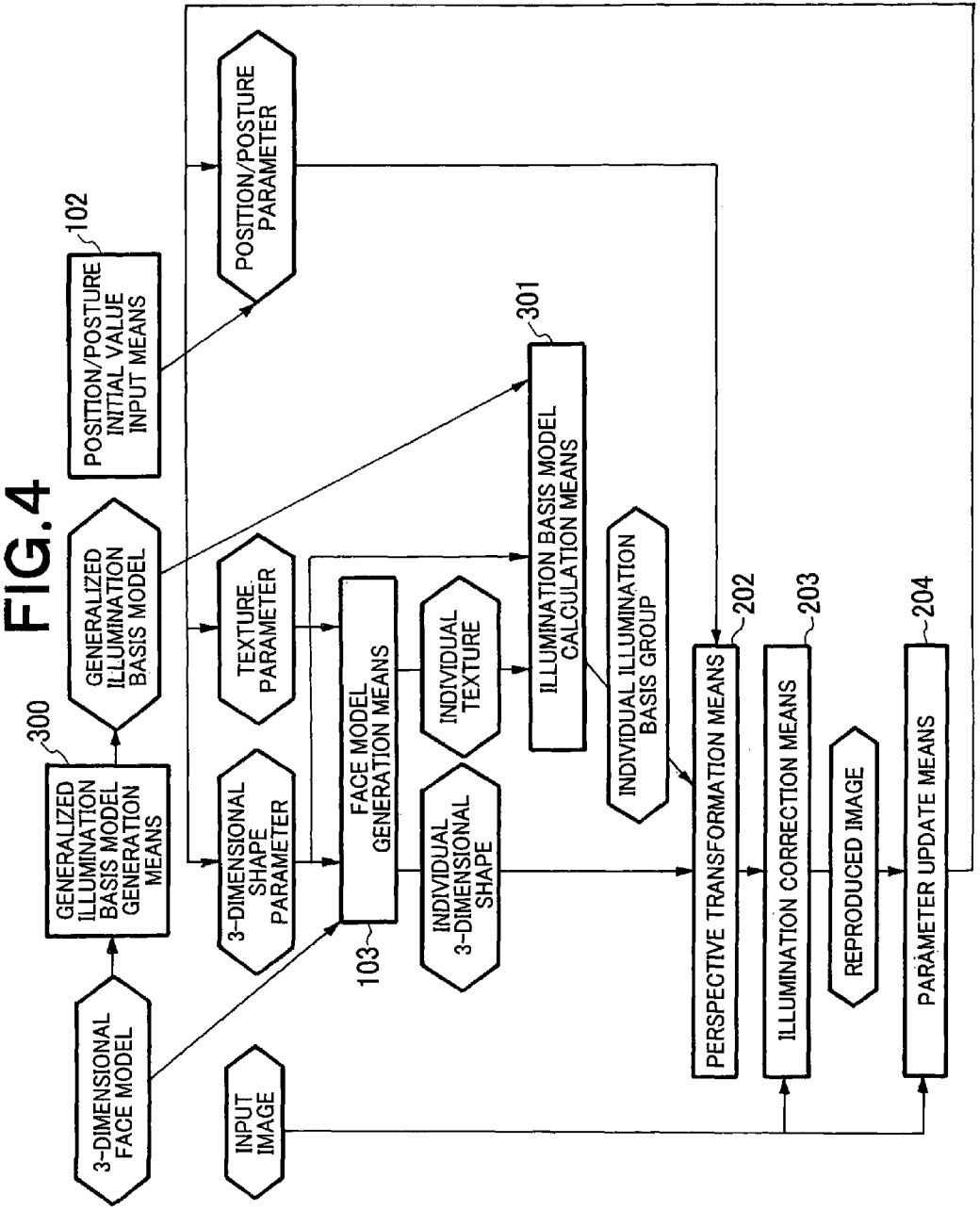
FIG. 4 is a block diagram showing another configuration example of the image processing system.

Next, a second embodiment of the present invention will be described with reference to the accompanying drawings. FIG. 4 is a block diagram showing another configuration example of the image processing system. As shown in FIG. 4, the image processing system according to the present embodiment includes a generalized illumination basis model generation means 300, a position/posture initial value input means 102, a face model generation means 103, an illumination basis model calculation means 301, a perspective transformation means 202, an illumination correction means 203, and a parameter update means 204.

As shown in FIG. 4, the image processing system according to the present embodiment includes the generalized illumination basis model generation means 300 in addition to the components shown in the first embodiment. Further, the image processing system of the present embodiment includes the illumination basis model calculation means 301 in place of the illumination basis calculation means 201.

Specifically, the generalized illumination basis model generation means 300 is realized by a CPU of an information processing apparatus which operates according to a program. The generalized illumination basis model generation means 300 has a function of previously generating a generalized illumination basis model using the generalized 3-dimensional face model as a preparation step of generating respective parameters and reproduced image using the image processing system.

The "illumination basis model" is a model describing the individual illumination basis of each person using a predetermined parameter. Further, the "illumination basis model" includes an average individual illumination basis and data representing how the individual illumination basis of respective persons which differ from one another depending on the shape of their faces changes from the average individual illumination basis. In the present embodiment, the generalized illumination basis model corresponds to a generalized 3-dimensional object shape model and is used for generating the illumination basis representing a basic variation in a reflection state caused due to a difference in the direction or intensity of illumination projected onto an individual object.

For example, the generalized illumination basis model generation means 300 uses the generalized 3-dimensional model stored in the face model storage means provided in the image processing system to previously generate the generalized illumination basis model. The image processing system includes an illumination basis model storage means (not shown) for storing the generalized illumination basis model generated by the generalized illumination basis model generation means 300. Specifically, the illumination basis model storage means is realized by a database unit such as a magnetic disk drive or optical disk drive.

Figure 5:
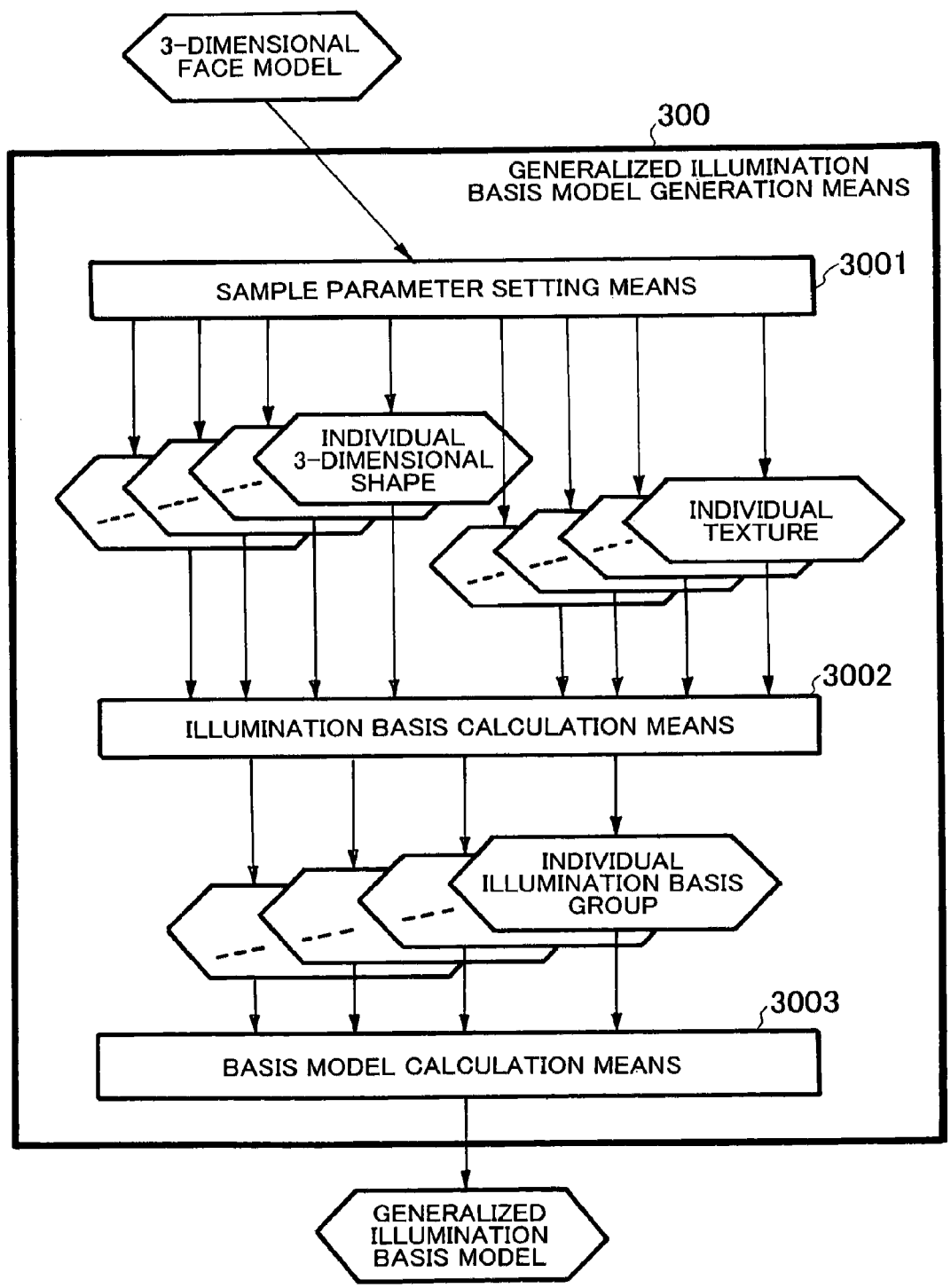
FIG. 5 is a block diagram showing an example of a configuration of a generalized illumination basis model generation means.

FIG. 5 is a block diagram showing an example of a configuration of the generalized illumination basis model generation means 300. As shown in FIG. 5, the generalized illumination basis model generation means 300 includes a sample parameter setting means 3001, an illumination basis calculation means 3002, and a basis model calculation means 3003.

The sample parameter setting means 3001 has a function of setting a random 3-dimensional shape parameter to be given to the generalized 3-dimensional object shape model. In the present embodiment, the sample parameter setting means 3001 sets various shape parameters to the generalized 3-dimensional face model to generate a large number of sets of a sample 3-dimensional shape and sample texture. The sample parameter setting means 3001 can set these parameters using various determination methods. In the present embodiment, the sample parameter setting means 3001 sets respective parameter values on the assumption that the 3-dimensional shape parameter $\{s_i\}$ is a random number whose average value is 0 and whose distribution depends on Gaussian distribution of eigenvalues $\sigma_{si}$ and $\sigma_{ti}$. Further, the sample parameter setting means 3001 determines $n_s$ sets of 3-dimensional shape parameters $\{s_{ki}\}$ (k=1, 2, ..., $n_s$) and generates $n_s$ sample 3-dimensional shape data according to the above expression (4).

The illumination basis calculation means 3002 has a function of calculating the illumination basis groups corresponding to the respective parameters based on the sample 3-dimensional shape group which is generated by giving the parameters set by the sample parameter setting means 3001 to the generalized 3-dimensional object model. In the present embodiment, the illumination basis calculation means 3002 calculates a sample illumination basis group $\{b_{jk}\}$ (k=1, ..., $n_s$) for each sample 3-dimensional shape data generated by the sample parameter setting means 3001 according to the above expression (12).

Further, the illumination basis calculation means 3002 calculates the individual illumination basis using predetermined spherical harmonics based on the individual 3-dimensional shape. However, in the present embodiment, unlike the harmonic function calculation means 2012 described in the first embodiment, the illumination basis calculation means 3002 does not use the texture data but calculates the sample illumination basis group with the value of $t^{(i)}$ set to 1 in the expression (12). That is, the sample illumination basis group calculated by the illumination basis calculation means 3002 only contains a component whose luminance value changes depending on only the 3-dimensional shape.

Further, at the time of calculation of the individual illumination basis, the illumination basis calculation means 3002 first sets various illumination conditions. Then, the illumination basis calculation means 3002 calculates the luminance values of respective portions on the surface of an object under the set illumination conditions. Finally, the illumination basis calculation means 3002 calculates the individual illumination basis group based on the obtained luminance values.

The basis model calculation means 3003 uses the illumination basis group calculated by the illumination basis calculation means 3002 and the basis vector and eigenvalue of the generalized 3-dimensional object model to calculate the basis vector of the generalized illumination basis model. In the present embodiment, the basis model calculation means 3003 calculates the basis vector representing a sample illumination basis group $\{b_{kj}\}$ generated by the illumination basis calculation means 3002 by a linear model. It is assumed here that a vector in which the elements of the illumination basis group $\{b_{kj}\}$ of the sample 3-dimensional shape data k are arranged is $B_k$ and its average vector is bar B. Further, a predetermined matrix B is defined by the following expression (15).

[Numeral 11]

$$B = [B_1 - \bar{B}, B_2 - \bar{B}, \ldots B_{ns} - \bar{B}]$$ expression (15)

The basis model calculation means 3003 uses values of predetermined matrixes $U_s$ and $\Sigma_s$ (matrixes $U_s$ and $\Sigma_s$ represented by the above expression (2) used in the calculation of the generalized 3-dimensional face model) to calculate a matrix C according to the following expression (16).

$$C^T = \Sigma_s^{-1} U_s^{-1} B^T$$ expression (16)

The basis model calculation means 3003 then stores the column vector of the matrix C in the illumination basis model storage means as the basis vector group $\{c_i\}$ of the generalized illumination basis model.

By using the generalized illumination basis model generated by the generalized illumination basis model generation means 300, it is possible to calculate the value of the illumination basis (in this case, however, texture=1) of a sample face shape by a linear sum of $\{c_i\}$ having, as a coefficient, the shape parameter $\{s_i\}$ at the time when the sample shape is generated from the generalized 3-dimensional face model. Therefore, the illumination basis model calculation means 301 can calculate the individual illumination basis group $\{b_j\}$ of an object whose 3-dimensional shape parameter is $\{s_i\}$ and whose individual texture is $\{T\}$ according to the following expression (17).

[Numeral 12]

$$b_j^{(k)} = T^{(k)}(\bar{B}^{(k)} + \Sigma_i s_i c_i^{(k)})$$ expression (17)

In the expression (17), (k) represents a value of a k-th element.

Specifically, the illumination basis model calculation means 301 is realized by a CPU of an information processing apparatus which operates according to a program. The illumination basis model calculation means 301 receives, as an input, a current 3-dimensional shape parameter $\{s_i\}$ and individual texture $\{T\}$ calculated by the face model generation means 103 to calculate the illumination basis using the generalized illumination basis model generated by the generalized illumination basis model generation means 300. In this case, the illumination basis model calculation means 301 calculates the individual illumination basis group according to the above expression (17). In the present embodiment, unlike the illumination basis calculation means 201 described in the first embodiment, the illumination basis model calculation means 301 need not calculate a normal vector from the individual 3-dimensional shape but can calculate the individual illumination basis group $\{b_j\}$ only with a simple linear calculation using the expression (17).

The illumination basis model calculation means 301 calculates the individual illumination basis corresponding to the individual 3-dimensional shape that the generalized illumination basis model generation means 300 generates using the generalized 3-dimensional object shape model by using the same parameter as the 3-dimensional shape parameter to be given to the generalized 3-dimensional object shape model.

The functions of the position/posture initial value input means 102, face model generation means 103, perspective transformation means 202, illumination correction means 203, and parameter update means 204 are the same as those described in the first embodiment.

Figure 6:
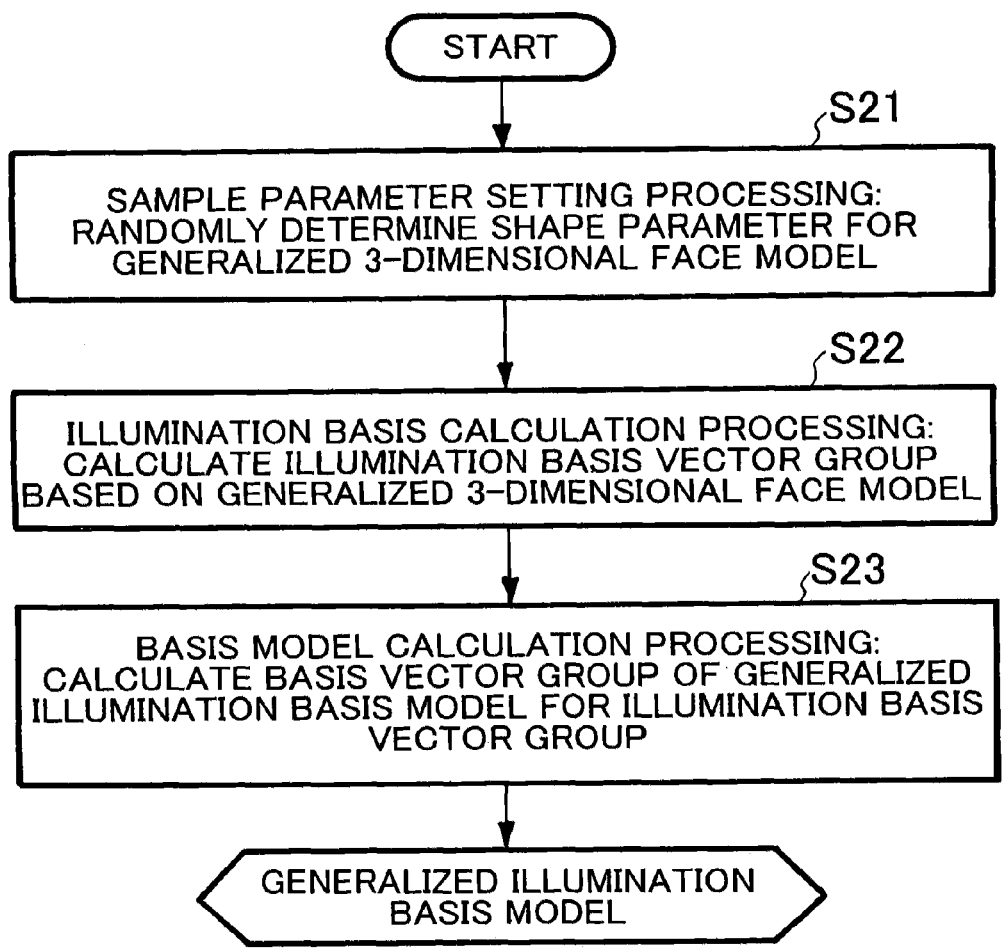
FIG. 6 is a flowchart showing an example of a processing procedure for the image processing system to previously generate a generalized illumination basis model.

Operation will next be described. First, before generating respective parameters or reproduced image, the image processing system previously performs calculation of the generalized illumination basis model. FIG. 6 is a flowchart showing an example of a processing procedure for the image processing system to previously generate the generalized illumination basis model.

The generalized illumination basis model generation means 300 determines an adequate number of sets of random 3-dimensional shape parameters for the generalized 3-dimensional face model (step S21). Further, the generalized illumination basis model generation means 300 calculates the individual 3-dimensional shape from each set of the determined 3-dimensional shape parameters using the generalized 3-dimensional face model and calculates the normal vector of the calculated individual 3-dimensional shape. Then, the generalized illumination basis model generation means 300 calculates the illumination basis vector group on the assumption that the luminance of the texture is all "1" (step S22).

The generalized illumination basis model generation means 300 calculates the basis vector group of the generalized illumination basis model for the calculated illumination basis vector group according to the above expression (16) (step S23) Further, the generalized illumination basis model generation means 300 stores the calculated basis vector group of the generalized illumination basis model in the illumination basis model storage means.

With the above processing, the generalized illumination basis model is previously generated and is stored in the illumination basis model storage means. The image processing system performs the following processing after the above-mentioned illumination basis model generation processing.

Figure 7:
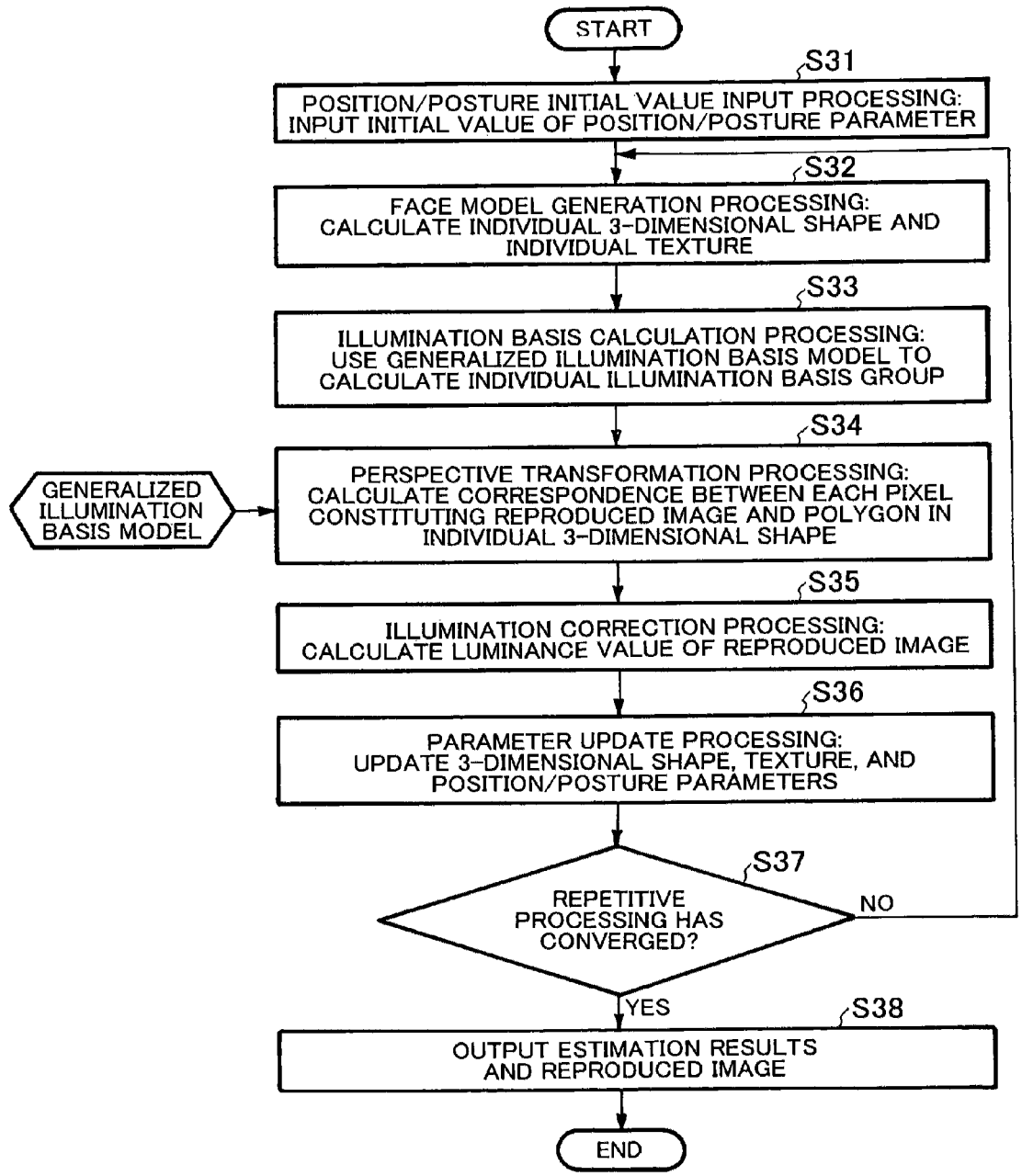
FIG. 7 is a flowchart showing another example of a processing procedure for the image processing system to process an input image so as to calculate respective parameters.

FIG. 7 is a flowchart showing another example of a processing procedure for the image processing system to process an input image so as to calculate respective parameters. As in the case of the first embodiment, when photographing an image to be input using the image pickup means according to, e.g., user's photographing operation, the image processing system starts processing of the input image so as to calculate values of the respective parameters. First, the position/posture initial value input means 102 of the image processing system inputs the initial value of the position/posture parameter $\{p, \gamma, \theta, \phi\}$ from the input image according to a user's input instruction (step S31).

The face model generation means 103 uses current values of a 3-dimensional shape parameter $\{s_i\}$ and texture parameter $\{t_i\}$ and generalized face model represented by the above expression (3) to calculate an individual 3-dimensional shape and individual texture (step S32). In this case, the face model generation means 103 uses a value of 0 as the initial values of the respective parameters $\{s_i\}$ and $\{t_i\}$ at the initial processing time of repetitive processing to calculate the individual 3-dimensional shape and individual texture.

The illumination basis model calculation means 301 calculates the individual illumination basis group based on the 3-dimensional shape parameter $\{s_i\}$ calculated by the face model generation means 103 and generalized illumination basis model stored in the illumination basis model storage means according to the above expression (17) (step S33).

The perspective transformation means 202 uses the individual 3-dimensional shape calculated by the face model generation means 103 and a current position/posture parameter to calculate correspondence between each pixel constituting a reproduced image and a polygon in the individual 3-dimensional shape based on the relationship represented by the above expression (4) (step S34). In this case, at the initial processing of repetitive processing, the perspective transformation means 202 uses the initial value of the position/posture parameter input by the position/posture initial value input means 102 to calculate correspondence between each pixel constituting the reproduced image and polygon in the individual 3-dimensional shape. Further, the perspective transformation means 202 calculates a vector group $\{b_j\}$ in which values of the individual illumination basis of the polygon corresponding to each pixel constituting the reproduced image are arranged to generate an individual illumination basis image group.

The illumination correction means 203 uses an input image $I_{input}$ and individual illumination basis group generated by the illumination basis model calculation means 301 to calculate a luminance value $I_{model}$ of the reproduced image according to the above expression (13) (step S35).

The parameter update means 204 uses the input image $I_{input}$, reproduced image $I_{model}$ generated by the illumination correction means 203, and eigenvalues $\sigma_{si}$, $\sigma_{ti}$ of a generalized face model to calculate a cost function E. Further, the parameter update means 204 updates the respective parameters of the 3-dimensional shape, texture, and position/posture so as to minimize the cost function E using a probabilistic descent method (step S36).

The parameter update means 204 determines whether the parameter search using the probabilistic descent method has converged (step S37). More specifically, when a difference between each new parameter after update calculated in step S36 and each original parameter before update is smaller than a previously set threshold value, the parameter update means 204 determines that the repetitive processing has converged and ends the processing. Further, when the value of the cost function E is not smaller than that before parameter update, the parameter update means 204 determines that the repetitive processing has converged and ends the processing. When the repetitive processing has not converged, the processing flow returns to step S32 where the image processing system repeats the processing of step S32 and subsequent processing using an updated parameter $\alpha^*$.

When it is determined that the repetitive processing has converged, the image processing system outputs, as estimation results, updated respective parameters (3-dimensional shape parameter, texture parameter, and position/posture parameter) and reproduced image (step S38). For example, the image processing system outputs the updated respective parameters and reproduced image to a storage medium such as a CD-ROM. Further, for example, the image processing system displays the updated respective parameters and reproduced image on a display unit.

As described above, according to the present embodiment, the image processing system includes the generalized illumination basis model generation means 300 to previously calculate the generalized illumination basis model. Then, using the generalized illumination basis model, the illumination basis can be obtained from the 3-dimensional shape parameter only with a simple linear calculation. This eliminates a need to calculate the normal vector from the 3-dimensional shape data, allowing the processing to be performed at high speed. Therefore, in addition to the advantages of the first embodiment, it is possible to increase the processing speed of calculation of shade and shadow in the image generation process and perform calculation of the illumination basis required when the linear illumination model is used at high speed.

Third Embodiment

Figure 8:
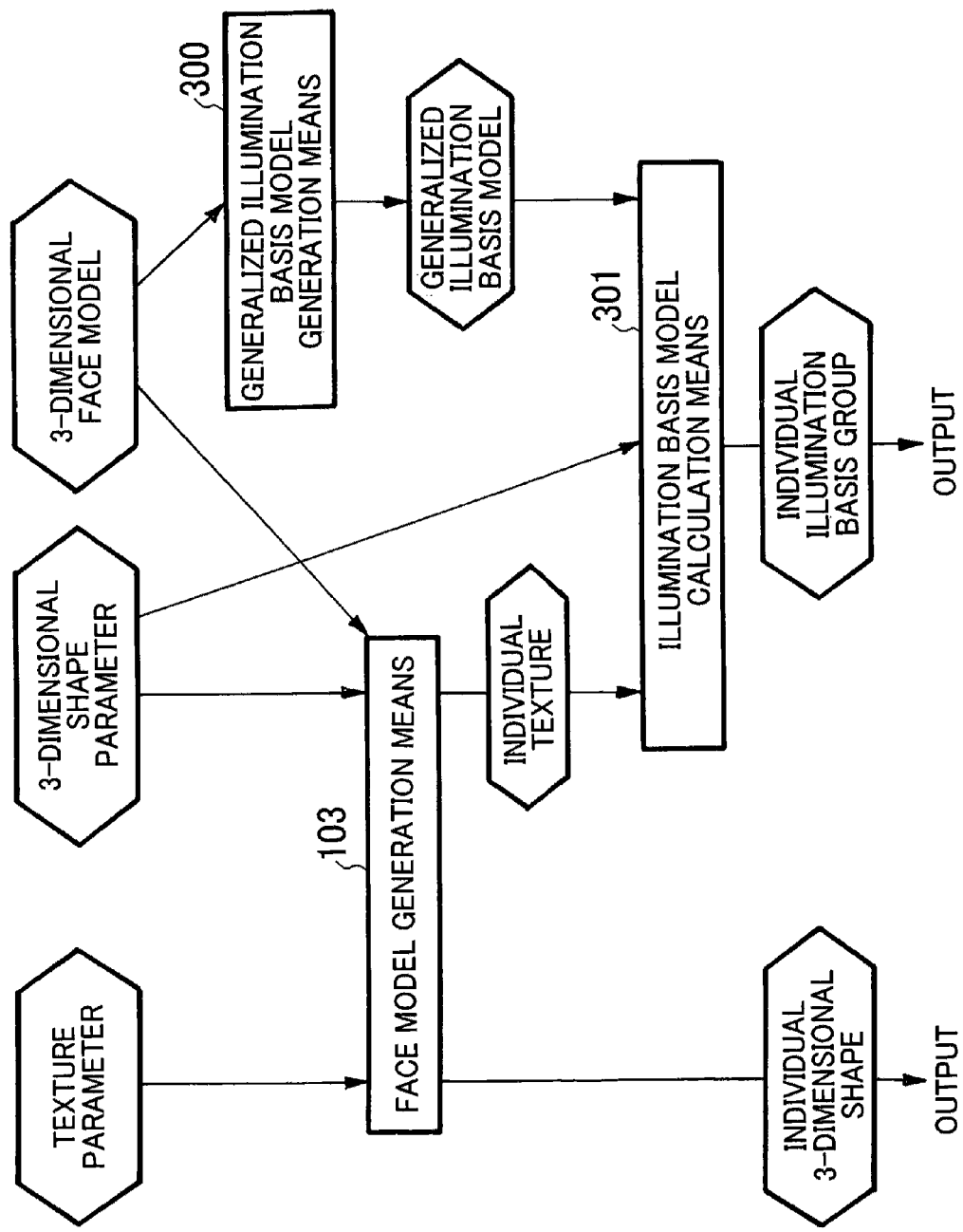
FIG. 8 is a block diagram showing still another configuration example of the image processing system.

Next, a third embodiment of the present invention will be described with reference to the accompanying drawing. FIG. 8 is a block diagram showing still another configuration example of the image processing system. As shown in FIG. 8, the image processing system according to the present embodiment includes the face model generation means 103, generalized illumination basis model generation means 300, and illumination basis model calculation means 301 which are described in the second embodiment. The image processing system receives, as an input, a 3-dimensional shape parameter and texture parameter of a face of a given person and outputs an individual 3-dimensional shape and individual illumination basis group.

First, the generalized illumination basis model generation means 300 previously generates a generalized illumination basis model corresponding to the generalized 3-dimensional face model according to the same processing as that of the second embodiment. The face model generation means 103 receives, as an input, the 3-dimensional shape parameter and texture parameter of a face of a given person to be processed and uses the generalized 3-dimensional face model to calculate an individual 3-dimensional shape and individual texture according to the same processing as that of the second embodiment. The illumination basis model calculation means 301 receives, as an input, the 3-dimensional shape parameter and generalized illumination basis model, and calculates an individual illumination basis group according to the same processing as that of the second embodiment.

In the present embodiment, the image processing system includes an output means (realized by a CPU and input/output section of an information processing apparatus which operates according to a program) for outputting the individual 3-dimensional shape generated by the face model generation means 103 and individual illumination basis group generated by the illumination basis model calculation means 301.

As described above, according to the present embodiment, the individual 3-dimensional shape and individual illumination basis are calculated based on the 3-dimensional shape parameter and texture parameter. Therefore, it is possible to calculate at high speed a 3-dimensional face model (set of 3-dimensional shape data and illumination basis group) based on which face images under various position/posture and illumination conditions can be generated.

The individual 3-dimensional shape and individual illumination basis group are required for the processing performed, e.g., in the face recognition system described in Document B. In the present embodiment, the image processing system has a function as a 3-dimensional face model generation system that provides the 3-dimensional shape data of a face of a person and illumination basis by generating them at high speed from the respective parameters.

In the face recognition system described in Document B, the 3-dimensional shape data and individual illumination basis obtained by measuring various persons are stored in a database, and a reproduced image of an input image is generated using the data of the various persons. Then, a reproduced image closest to the input image is determined as the target person. In this case, it is possible to use the image processing system according to the present embodiment as a substitute for the database of the face recognition system described in Document B. That is, in the face recognition system, the 3-dimensional shape parameter and texture parameter of each person are stored in place of the individual 3-dimensional shape data and individual illumination basis in the database. Then, when the individual 3-dimensional shape data and individual illumination basis of each person are calculated using the image processing system according to the present embodiment, it is possible to realize the face recognition system described in Document B.

Example 1

Example 1 of the present invention will be described below with reference to the accompanying drawings. In Example 1, operation of the image processing system will be described using a concrete example. Further, in Example 1, a case where the image processing system is applied to a 3-dimensional shape estimation system that estimates the 3-dimensional shape of a face of a person shown in a face image based on the face image will be described. A configuration of the image processing system shown in Example 1 corresponds to the configuration (shown in FIG. 1) described in the first embodiment of the present invention.

Figure 9:
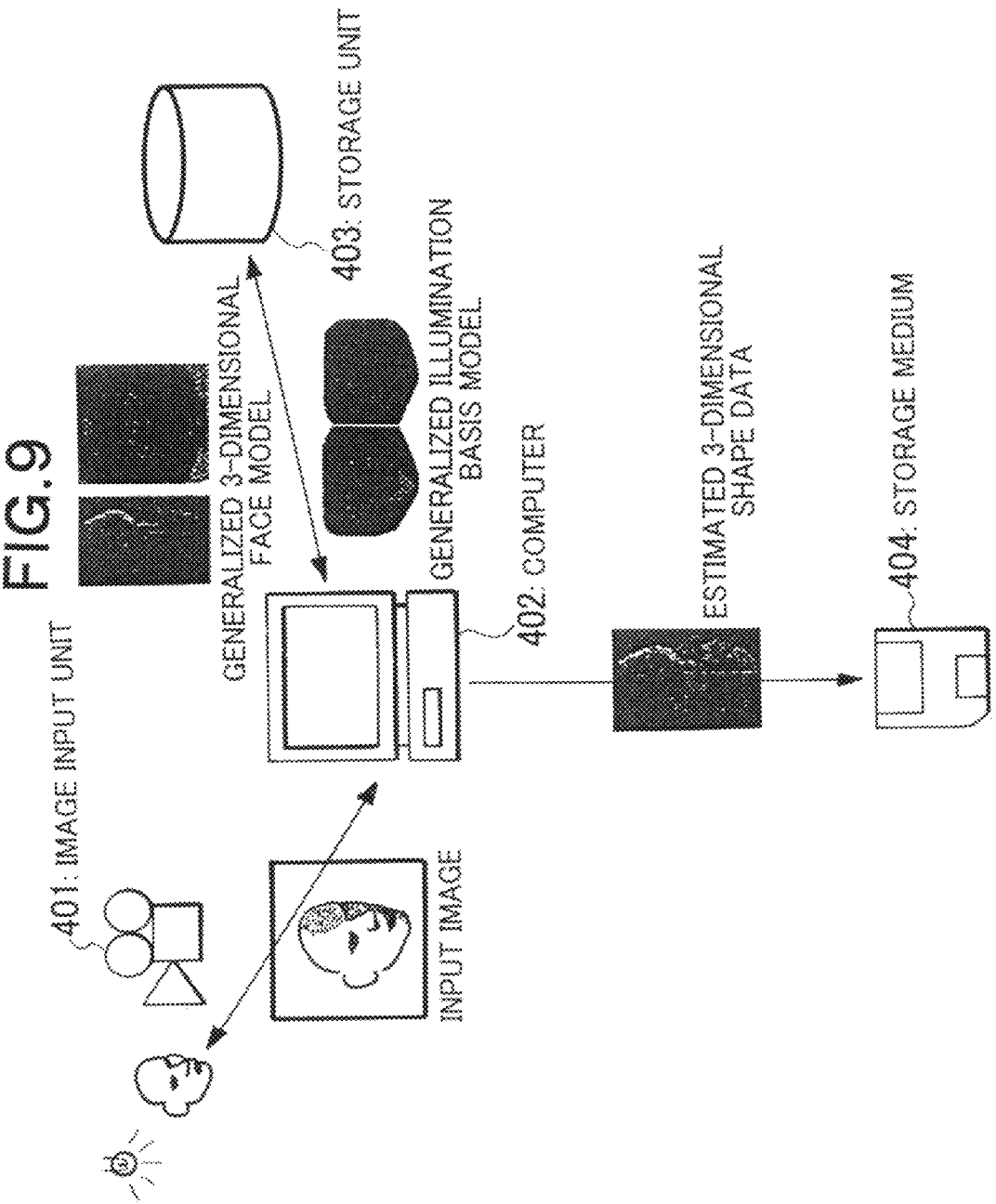
FIG. 9 is an explanatory view showing a concrete example of the image processing system.

FIG. 9 is an explanatory view showing a concrete example of the image processing system. As shown in FIG. 9, the image processing system according to Example 1 includes an image input unit 401 that photographs an image and inputs the photographed image, a computer 402 that executes various processing, a storage unit 403 that stores various data, and a storage medium 404 that stores and outputs data of estimation results.

The computer 402 includes the position/posture initial value input means 102, face model generation means 103, illumination basis calculation means 201, perspective transformation means 202, illumination correction means 203, and parameter update means 204.

The storage unit 403 previously stores the generalized 3-dimensional face model. For example, the storage unit 403 stores, as the generalized 3-dimensional face model data, 100 shape basis vectors, 100 texture basis vectors, and eigenvalues respectively corresponding to the shape basis vectors and texture basis vectors. The image processing system may use more than 100 basis vectors so as to increase estimation accuracy. Alternatively, the image processing system may reduce the number of basis vectors to less than 100 so as to increase processing speed.

Firstly, according to a user's instruction, the image input unit 401 photographs a face image of a person and outputs an input image 411 to the computer 402. Then, the computer 402 receives the input image 411 from the image input unit 401. For example, the computer 402 receives an input image 411 in which a face of a person is shown in the center of the image at a position 170 cm away from a camera with the direction thereof set to 40° on the left (posture parameter θ32 40), 10° in the downward direction ($\gamma$=10), and 0° in the horizontal direction ($\phi$=0). Further, in the input image 411, a light is irradiated on the face at a 60° from the right and 80° from the top, and the luminance intensity of the entire room is about half that of the light. As a matter of course, the correct direction of the face and illumination condition is unknown to the image processing system at the moment when the input image 411 is input.

The position/posture initial value input means 102 of the computer 402 inputs the initial value of the position/posture parameter $\{p, \gamma, \theta, \phi\}$ of the input image 411 according to a user's input instruction. Various methods can be used to input the initial value of the position/posture parameter. For example, the position/posture initial value input means 102 displays an image generated using an average 3-dimensional face shape and average texture according to a CG technique on a screen of a display unit of the computer 402, as shown in FIG. 10. In this case, as shown in FIG. 10, the position/posture initial value input means 102 displays the input image 411 and CG image 412 side-by-side on the screen of the display unit. A user changes the value of the position/posture parameter $\{p, \gamma, \theta, \phi\}$ while comparing the CG image 412 with the input image 411 and instructs the input of a value such that the CG image 412 becomes close to the input image 411. According to the user's input instruction, the position/posture initial value input means 102 inputs the initial value of the position/posture parameter $\{p, \gamma, \theta, \phi\}$. For example, in Example 1, the position/posture initial value input means 102 inputs p=[10, 5, 150], $\gamma$=5, $\theta$=45, and $\phi$=5, as the initial value of the position/posture parameter.

Then, the face model generation means 103 uses current values of a 3-dimensional shape parameter $\{s_i\}$ and texture parameter $\{t_i\}$ and generalized face model represented by the above expression (3) to calculate an individual 3-dimensional shape and individual texture. In this case, the face model generation means 103 previously reads out the generalized 3-dimensional face model stored in the storage unit 403 therefrom and calculates the individual 3-dimensional shape and individual texture. Further, the face model generation means 103 uses a value of 0 as the initial values of the respective parameters $\{s_i\}$ and $\{t_i\}$ at the initial processing time of repetitive processing to calculate the individual 3-dimensional shape and individual texture.

The illumination basis calculation means 201 uses the individual 3-dimensional shape and individual texture calculated by the face model generation means 103 to calculate a normal vector according to the above expression (11). Further, the illumination basis calculation means 201 calculates an individual illumination basis group according to the above expression (12). In Example 1, the illumination basis calculation means 201 calculates the individual illumination basis group with the number of the illumination basis set to 9. The number of the illumination basis that the illumination basis calculation means 201 calculates may be changed to various values. For example, it is possible to reduce the number of the illumination basis to be calculated for increasing processing speed. Alternatively, it is possible to increase the number of the illumination basis to be calculated for increasing estimation accuracy of respective parameters.

The perspective transformation means 202 uses the individual 3-dimensional shape and position/posture parameter to calculate correspondence between each pixel constituting a reproduced image and a polygon in the individual 3-dimensional shape based on the relationship represented by the above expression (4). Further, the perspective transformation means 202 calculates a vector group $\{b_j\}$ in which values of the individual illumination basis of the polygon corresponding to each pixel constituting the reproduced image to generate an individual illumination basis image group. For example, in the case where the number of pixels constituting the input image which corresponds to the individual 3-dimensional shape is 100, the perspective transformation means 202 calculates a vector group $\{b_j\}$ containing 100-dimensional vector.

The illumination correction means 203 uses an input image $I_{input}$ and individual illumination basis group generated by the illumination basis calculation means 201 to calculate a luminance value $I_{model}$ of the reproduced image according to the above expression (13).

The parameter update means 204 uses an input image $I_{input}$, reproduced image $I_{model}$ generated by the illumination correction means 203 and eigenvalues $\sigma_{si}$, $\sigma_{ti}$ of a generalized face model to calculate a cost function E. Further, the parameter update means 204 updates the respective parameters of the 3-dimensional shape, texture, and position/posture so as to minimize the cost function using a probabilistic descent method.

The parameter update means 204 determines whether the parameter search using the probabilistic descent method has converged. More specifically, when a difference between each new parameter after update and each original parameter before update is smaller than a previously set threshold value, the parameter update means 204 determines that the repetitive processing has converged and ends the processing. Further, when the value of the cost function E is not smaller than that before parameter update, the parameter update means 204 determines that the repetitive processing has converged and ends the processing. For example, the parameter update means 204 uses, as a threshold value for the parameter update amount, a threshold value "1 cm" of the element p and a threshold value "1°" of the angles $\gamma$, $\theta$, and $\phi$ of the face to determine whether the parameter search has converged. When the update amount of each of the calculated parameters is smaller than each of the above threshold values, the parameter update means 204 determines that the parameter search has converged. When the parameter search has not converged, the image processing system uses the updated parameters to repeatedly perform the respective processing performed by the face model generation means 103, illumination basis calculation means 201, perspective transformation means 202, illumination correction means 203, and parameter update means 204.

When the parameter search has converged, the image processing system outputs, to the storage medium 404, the individual 3-dimensional face shape and individual texture that the face model generation means 103 has generated from the 3-dimensional shape parameter and texture parameter obtained at their convergence time. The image processing system may generate a CG image using the individual 3-dimensional shape and individual texture and output the generated CG image to the storage medium 404. In the case where the image processing system is applied to a face posture estimation system that estimates the direction of a face, the image processing system may output the position/posture parameter obtained at its convergence time.

Example 2

Example 2 of the present invention will next be described with reference to the accompanying drawings. In Example 2, a case where the image processing system is applied to an object position/posture estimation system that estimates the position and posture of a face of a person shown in a face image based on the face image will be described. A configuration of the image processing system shown in Example 2 corresponds to the configuration (shown in FIG. 4) described in the second embodiment of the present invention.

In Example 2, the computer 402 includes the generalized illumination basis model generation means 300, position/posture initial value input means 102, face model generation means 103, illumination basis model calculation means 301, perspective transformation means 202, illumination correction means 203, and parameter update means 204 which are described in the second embodiment.

The storage unit 403 previously stores the generalized 3-dimensional face model. In Example 1, only the basis vectors and eigenvalues of the generalized face model are used. In Example 2, however, in constructing the generalized 3-dimensional face model, the value of a matrix US (matrix US in the above expression (2)) is stored together with the basis vectors and eigenvalues of the generalized face model in the storage means 403.

First, before the image processing system is used to generate the respective parameters and reproduced image, the generalized illumination basis model generation means 300 of the computer 402 previously calculates the generalized illumination basis model.

The sample parameter setting means 3001 determines an adequate number of sets of random 3-dimensional shape parameters for the generalized 3-dimensional face model. For example, the sample parameter setting means 3001 randomly sets 100 sets of parameters. The number of parameters may be changed to various values.

The illumination basis calculation means 3002 calculates the individual 3-dimensional shape from the each set of 3-dimensional shape parameters determined by the sample parameter setting means 3001 using the generalized 3-dimensional face model and calculates the normal vector of the calculated individual 3-dimensional shape. Further, the illumination basis calculation means 3002 calculates the illumination basis vector group on the assumption that the luminance of the texture is all "1".

The basis model calculation means 3003 calculates the basis vector group of the generalized illumination basis model for the illumination basis vector group calculated by the illumination basis calculation means 3002 according to the above expression (16). Further, the basis model calculation means 3003 stores the calculated basis vector group of the generalized illumination basis model in the storage unit 403. In Example 2, since the number of the 3-dimensional shape parameters is 100, the basis model calculation means 3003 calculates the basis vector group containing 100 basis vectors.

After previously performing the processing described above, the image processing system performs the following processing.

First, the position/posture initial value input means 102 of the computer 402 inputs the initial value of the position/posture parameter $\{p, \gamma, \theta, \phi\}$ according to a user's input instruction. In this case, as in the case of the Example 1, there is available a method in which a user manually inputs the initial value while viewing the CG image. However, in Example 2, a case where the user instructs input of the positions of both eyes or edge of the mouth with respect to the input image 411 while viewing it will be described. In Example 2, positions of the corresponding points are previously given to an average 3-dimensional shape data (for example, position information of the corresponding points are previously stored in the storage unit 403). Then, the position/posture initial value input means 102 uses a previously stored 3-dimensional coordinate and position data of the points input according to the user's operation to calculate the posture of a face.

The face model generation means 103 uses current values of a shape parameter $\{s_i\}$ and texture parameter $\{t_i\}$ and generalized face model represented by the above expression (3) to calculate the individual 3-dimensional shape and individual texture. In this case, the face model generation means 103 uses a value of 0 as the initial values of the respective parameters $\{s_i\}$ and $\{t_i\}$ at the initial processing time of repetitive processing to calculate the individual 3-dimensional shape and individual texture.

The illumination basis model calculation means 301 calculates the individual illumination basis group based on the 3-dimensional shape parameter $\{s_i\}$ calculated by the face model generation means 103 and generalized illumination basis model stored in the storage unit 403 according to the above expression (17).

The perspective transformation means 202 uses the individual 3-dimensional shape calculated by the face model generation means 103 and a current position/posture parameter to calculate correspondence between each pixel constituting a reproduced image and a polygon in the individual 3-dimensional shape based on the relationship represented by the above expression (4). Further, the perspective transformation means 202 calculates a vector group $\{b_j\}$ in which values of the individual illumination basis of the polygon corresponding to each pixel constituting the reproduced image to generate an individual illumination basis image group.

The illumination correction means 203 uses an input image $I_{input}$ and individual illumination basis group generated by the illumination basis model calculation means 301 to calculate a luminance value $I_{model}$ of the reproduced image according to the above expression (13).

The parameter update means 204 uses the input image $I_{input}$, reproduced image $I_{model}$ generated by the illumination correction means 203, and eigenvalues $\sigma_{si}$, $\sigma_{ti}$ of a generalized face model to calculate a cost function E. Further, the parameter update means 204 updates the respective parameters of the 3-dimensional shape, texture, and position/posture so as to minimize the cost function E using a probabilistic descent method.

The parameter update means 204 determines whether the parameter search using the probabilistic descent method has converged. More specifically, when a difference between each new parameter after update made in step S36 shown in FIG. 7 and each original parameter before update is smaller than a previously set threshold value, the parameter update means 204 determines that the repetitive processing has converged and ends the processing. Further, when the value of the cost function E is not smaller than that before parameter update, the parameter update means 204 determines that the repetitive processing has converged and ends the processing. When the repetitive processing has not converged, the image processing system uses the updated parameters to repeatedly perform the respective processing performed by the face model generation means 103, illumination basis model calculation means 301, perspective transformation means 202, illumination correction means 203, and parameter update means 204.

When the repetitive processing has converged, the image processing system outputs, as an estimation value of the position/posture of a face shown in the input image, the value of the position/posture parameter at its convergence time. For example, the image processing system outputs, to, e.g., the storage medium 404, the data representing the position and posture (position/posture parameter).

Although the present invention has been described with reference to the preferred embodiments, the present invention is not limited to the above embodiment and it is apparent to those skilled in the art that a variety of modifications and changes may be made based on the description of the claims without departing from the scope of the present invention. Such modifications and changes are also within the scope of the present invention.

In the case of realizing at least a part of the functions of the respective means constituting each embodiment described above using program codes, the program codes and a recording medium to record the program codes are included in the category of the present invention. In this case, when the functions are realized together with the operating system or other application softwares, etc., the program codes include program codes thereof. Examples of the recording medium include any type of recording medium such as disk-shaped recording medium (optical disk, magnet-optical disk, magnetic disk, etc.), tape-shaped recording medium (magnetic tape, etc.), or card-shaped recording medium (memory card, etc.).

INDUSTRIAL APPLICABILITY

The present invention is applicable to a 3-dimensional shape estimation system that estimates the 3-dimensional shape of a face of a person shown in a face image from one or plurality of the face images. Further, the present invention is applicable to an object position/posture estimation system that estimates the direction of a face of a person shown in an input image by outputting an estimated posture parameter. Furthermore, the present invention is applicable to an image generation system that generates a reproduced image (e.g., CG image) of an input image.

The invention claimed is:

1. An image processing system comprising:
    an individual data generation unit generating individual 3-dimensional shape data representing the 3-dimensional shape of an individual object and individual texture data representing the texture of the individual object based on a 3-dimensional shape parameter and texture parameter using, a generalized 3-dimensional object model which is calculated based on 3-dimensional shape data and texture data of a plurality of objects similar to one another;
    a generalized illumination basis model generation unit generating a generalized illumination basis model which corresponds to the generalized 3-dimensional object model and is used for generating illumination basis representing a basic variation in a reflection state caused due to a difference in the direction or intensity of illumination projected onto an individual object; and
    a second illumination basis calculation unit calculating an individual illumination basis representing a variation in the luminance value of each portion of the 3-dimensional surface of the individual object under various illumination conditions using the generalized illumination basis model generated by the generalized illumination basis model generation unit.

2. The image processing system according to claim 1, further comprising an output unit outputting the individual 3-dimensional shape data generated by the individual data generation unit and individual illumination basis generated by the second illumination basis calculation unit.

3. The image processing system according to claim 1, further comprising:
    a reproduced image generation unit generating a reproduced image which is an image reproducing the same illumination condition as an input image using the individual illumination basis group calculated by the second illumination basis calculation unit; and
    a parameter update unit repeatedly updating the 3-dimensional shape parameter and texture parameter to be given to the generalized 3-dimensional object model such that the reproduced image generated by the reproduced image generation unit is close to the input image until a predetermined convergence condition is satisfied.

4. The image processing system according to claim 3, wherein
    the second illumination basis calculation unit calculates the individual illumination basis corresponding to the individual 3-dimensional shape data that the generalized illumination basis model generation unit generates using the generalized 3-dimensional object model by using the same parameter as the 3-dimensional shape parameter to be given to the generalized 3-dimensional object model.

5. The image processing system according to claim 4, wherein
    the generalized illumination basis model generation unit includes:
    a parameter setting unit setting a random 3-dimensional shape parameter to be given to the generalized 3-dimensional object model;

a third illumination basis calculation unit calculating the illumination basis groups corresponding to the respective parameters based on the sample 3-dimensional shape group which is generated by giving the parameters set by the parameter setting unit to the generalized 3-dimensional object model; and a basis calculation unit calculating the basis vector of the generalized illumination basis model using the illumination basis group calculated by the third illumination basis calculation unit and the basis vector and eigenvalue of the generalized 3-dimensional object model.

6. The image processing system according to claim 5, wherein
the third illumination basis calculation unit calculates the individual illumination basis using spherical harmonics based on the individual 3-dimensional shape data.

7. The image processing system according to claim 5, wherein
the third illumination basis calculation unit includes:
an illumination condition setting unit setting a plurality of different illumination conditions;
a luminance calculation unit calculating the luminance value of each portion of the surface of the object under various illumination conditions set by the illumination condition setting unit; and
a calculation unit calculating the individual illumination basis group based on the luminance value calculated by the luminance calculation unit by main component analysis.

8. An image processing method comprising:
an individual data generation step of generating individual 3-dimensional shape data representing the 3-dimensional shape of an individual object and individual texture data representing the texture of the individual object based on a 3-dimensional shape parameter and texture parameter using a generalized 3-dimensional object model which is calculated based on 3-dimensional shape data and texture data of a plurality of objects similar to one another;
a generalized illumination basis model generation step of generating a generalized illumination basis model which corresponds to the generalized 3-dimensional object model and is used for generating illumination basis representing a basic variation in a reflection state caused due to a difference in the direction or intensity of illumination projected onto an individual object; and
a second illumination basis calculation step of calculating an individual illumination basis representing a variation in the luminance value of each portion of the 3-dimensional surface of the individual object under various illumination conditions using the generated generalized illumination basis model.

9. The image processing method according to claim 8, further comprising an output step of outputting the individual 3-dimensional shape data generated in the individual data generation step and individual illumination basis generated in the second illumination basis calculation step.

10. The image processing method according to claim 8, further comprising:
a reproduced image generation step of generating a reproduced image which is an image reproducing the same illumination condition as an input image using the individual illumination basis group calculated in the second illumination basis calculation step; and
a parameter update step of repeatedly updating the 3-dimensional shape parameter and texture parameter to be given to the generalized 3-dimensional object model such that the generated reproduced image is close to the input image until a predetermined convergence condition is satisfied.

11. The image processing method according to claim 10, wherein
the second illumination basis calculation step calculates the individual illumination basis corresponding to the individual 3-dimensional shape data that the generalized illumination basis model generation step generates using the generalized 3-dimensional object model by using the same parameter as the 3-dimensional shape parameter to be given to the generalized 3-dimensional object model.

12. The image processing method according to claim 11, further comprising:
a parameter setting step of setting a random 3-dimensional shape parameter to be given to the generalized 3-dimensional object model;
a third illumination basis calculation step of calculating the illumination basis groups corresponding to the respective parameters based on the sample 3-dimensional shape group which is generated by giving the set parameters to the generalized 3-dimensional object model; and
a basis calculation step of calculating the basis vector of the generalized illumination basis model using the calculated illumination basis group and the basis vector and eigenvalue of the generalized 3-dimensional object model.

13. The image processing method according to claim 12, wherein
the third illumination basis calculation step calculates the individual illumination basis using spherical harmonics based on the individual 3-dimensional shape data.

14. The image processing method according to claim 12, wherein
the third illumination basis calculation step sets a plurality of different illumination conditions, calculates the luminance value of each portion of the surface of the object under the set various illumination conditions, and calculates the individual illumination basis group based on the calculated luminance value by main component analysis.

15. A non-transitory computer-readable storage medium storing an image processing program, the image processing program allowing a computer to execute:
individual data generation processing that generates individual 3-dimensional shape data representing the 3-dimensional shape of an individual object and individual texture data representing the texture of the individual object based on a 3-dimensional shape parameter and texture parameter using a generalized 3-dimensional object model which is calculated based on 3-dimensional shape data and texture data of a plurality of objects similar to one another;
generalized illumination basis model generation processing that generates a generalized illumination basis model which corresponds to the generalized 3-dimensional object model and is used for generating illumination basis representing a basic variation in a reflection state caused due to a difference in the direction or intensity of illumination projected onto an individual object; and
second illumination basis calculation processing that calculates an individual illumination basis representing a variation in the luminance value of each portion of the 3-dimensional surface of the individual object under various illumination conditions using the generated generalized illumination basis model.

* * * * *